United States Patent
Goldberg

(10) Patent No.: US 9,870,796 B2
(45) Date of Patent: Jan. 16, 2018

(54) EDITING VIDEO USING A CORRESPONDING SYNCHRONIZED WRITTEN TRANSCRIPT BY SELECTION FROM A TEXT VIEWER

(71) Applicant: TIGERFISH, San Francisco, CA (US)

(72) Inventor: Adam Michael Goldberg, San Francisco, CA (US)

(73) Assignee: Tigerfish, San Francisco, CA (US)

( * ) Notice: Subject to any disclaimer, the term of this patent is extended or adjusted under 35 U.S.C. 154(b) by 201 days.

(21) Appl. No.: 14/185,611

(22) Filed: Feb. 20, 2014

(65) Prior Publication Data

US 2014/0169767 A1 Jun. 19, 2014

Related U.S. Application Data

(60) Continuation-in-part of application No. 13/664,353, filed on Oct. 30, 2012, now Pat. No. 9,141,938, which is a division of application No. 12/127,635, filed on May 27, 2008, now Pat. No. 8,306,816.

(60) Provisional application No. 60/940,197, filed on May 25, 2007.

(51) Int. Cl.
  *G11B 27/031* (2006.01)
  *G06Q 10/10* (2012.01)

(52) U.S. Cl.
  CPC .......... *G11B 27/031* (2013.01); *G06Q 10/10* (2013.01)

(58) Field of Classification Search
  CPC ..... G10L 15/26; G10L 15/265; G11B 27/031; G11B 27/10; G06F 17/30017; G06F 17/3002; G06F 17/211
  USPC .............. 704/235, 278; 386/278, 281, 290; 715/201, 203
  See application file for complete search history.

(56) References Cited

U.S. PATENT DOCUMENTS

| 5,623,681 | A | | 4/1997 | Rivette et al. |
| 5,659,742 | A | * | 8/1997 | Beattie .............. G06F 17/30017 |
| 5,832,171 | A | * | 11/1998 | Heist .................... G11B 27/031 386/241 |
| 6,166,736 | A | * | 12/2000 | Hugh .................... G06F 3/0481 715/777 |
| 6,332,147 | B1 | | 12/2001 | Moran et al. |
| 6,369,835 | B1 | | 4/2002 | Lin |
| 6,513,003 | B1 | | 1/2003 | Angell et al. |

(Continued)

*Primary Examiner* — Martin Lerner
(74) *Attorney, Agent, or Firm* — Michael A. Glenn; Perkins Coie LLP

(57) ABSTRACT

A network-based method and system for working with transcripts and corresponding video allows a media editor to rapidly edit video based on its corresponding written transcript, rapidly create amalgamated video from segments of multiple videos working from the corresponding transcripts, as well as assign attributes to video and audio and their corresponding written transcripts. The user can quickly find and access portions of transcripts and the corresponding video segments within a single, multi-video project and across multiple projects. A network-based workspace application allows the user to access several workspace panels on his/her Internet browser. Workspace panels can slide into view, be hidden from view, and expand/collapse in size so that the user can work with combinations of workspace panels to best meet the needs of the tasks he/she is performing. Each panel represents a step in a multi-step process that begins with a collection of videos and corresponding transcripts.

18 Claims, 24 Drawing Sheets

(56) References Cited

U.S. PATENT DOCUMENTS

| | | | |
|---|---|---|---|
| 6,925,455 B2* | 8/2005 | Gong | G06F 17/30029 370/252 |
| 7,039,857 B2* | 5/2006 | Beck | G06F 17/30017 715/202 |
| 7,096,416 B1* | 8/2006 | Smith | G06F 17/241 715/203 |
| 7,206,303 B2* | 4/2007 | Karas | G06F 17/30855 348/461 |
| 7,236,932 B1 | 6/2007 | Grajski | |
| 7,292,979 B2* | 11/2007 | Karas | G06F 17/30017 704/243 |
| 7,376,561 B2 | 5/2008 | Rennillo et al. | |
| 7,444,285 B2 | 10/2008 | Forbes | |
| 7,539,086 B2 | 5/2009 | Jaroker | |
| 7,559,033 B2 | 7/2009 | Boss et al. | |
| 7,617,445 B1 | 11/2009 | Townsend et al. | |
| 7,627,810 B2* | 12/2009 | Glazer | G06F 17/30038 715/201 |
| 7,669,127 B2* | 2/2010 | Hull | G06F 17/30038 715/716 |
| 7,870,488 B2* | 1/2011 | Kirkpatrick | G06F 17/241 715/720 |
| 7,877,774 B1* | 1/2011 | Basso | G06F 17/3002 725/115 |
| 7,899,670 B1 | 3/2011 | Young et al. | |
| 7,974,715 B2 | 7/2011 | Townsend et al. | |
| 8,050,906 B1 | 11/2011 | Zimmerman et al. | |
| 8,239,385 B2* | 8/2012 | Yang | C01B 33/26 707/736 |
| 8,306,816 B2 | 11/2012 | Goldberg | |
| 8,762,834 B2 | 6/2014 | Falk et al. | |
| 8,806,320 B1 | 8/2014 | Abdo | |
| 8,972,840 B2* | 3/2015 | Karas | G06F 17/30855 704/253 |
| 8,972,841 B2 | 3/2015 | Glazer et al. | |
| 9,141,938 B2* | 9/2015 | Goldberg | G10L 15/01 |
| 2002/0093591 A1* | 7/2002 | Gong | G06F 17/30029 348/515 |
| 2002/0133513 A1* | 9/2002 | Townsend | G06F 17/30017 715/203 |
| 2003/0046350 A1 | 3/2003 | Chintalapati et al. | |
| 2003/0078973 A1* | 4/2003 | Przekop | G06Q 10/10 709/204 |
| 2003/0086409 A1* | 5/2003 | Karas | G06F 17/30855 370/350 |
| 2003/0101054 A1 | 5/2003 | Davis et al. | |
| 2003/0105631 A1 | 6/2003 | Habte | |
| 2004/0064317 A1 | 4/2004 | Othmer et al. | |
| 2004/0080528 A1* | 4/2004 | Rand | G06F 17/30017 715/738 |
| 2005/0010407 A1 | 1/2005 | Jaroker | |
| 2005/0033753 A1 | 2/2005 | Mundell et al. | |
| 2005/0043958 A1* | 2/2005 | Koch | G11B 27/10 704/277 |
| 2005/0080633 A1 | 4/2005 | Lueck et al. | |
| 2005/0102140 A1 | 5/2005 | Davne et al. | |
| 2005/0102146 A1 | 5/2005 | Lucas | |
| 2005/0137867 A1 | 6/2005 | Miller | |
| 2005/0154613 A1 | 7/2005 | Kade | |
| 2005/0183031 A1 | 8/2005 | Onslow | |
| 2006/0149558 A1 | 7/2006 | Kahn et al. | |
| 2006/0179403 A1* | 8/2006 | Kirkpatrick | G06F 17/241 715/202 |
| 2006/0256933 A1 | 11/2006 | Wolfe et al. | |
| 2007/0005616 A1 | 1/2007 | Hay et al. | |
| 2007/0016401 A1 | 1/2007 | Ehsani et al. | |
| 2007/0074116 A1 | 3/2007 | Thomas | |
| 2007/0074166 A1* | 3/2007 | Overturf | G06F 11/3688 717/124 |
| 2007/0162856 A1* | 7/2007 | Schlossberg | G06Q 30/00 715/730 |
| 2007/0192107 A1 | 8/2007 | Sitomer et al. | |
| 2007/0250316 A1 | 10/2007 | Ramaswamy et al. | |
| 2007/0250317 A1 | 10/2007 | Davis et al. | |
| 2008/0059173 A1 | 3/2008 | Gilbert et al. | |
| 2008/0300873 A1 | 12/2008 | Siminoff | |
| 2008/0319743 A1 | 12/2008 | Faisman | |
| 2009/0023433 A1* | 1/2009 | Walley | H04M 1/72569 455/418 |
| 2009/0276215 A1 | 11/2009 | Hager et al. | |
| 2010/0192107 A1 | 7/2010 | Takahashi et al. | |
| 2010/0287473 A1 | 11/2010 | Recesso et al. | |
| 2012/0304062 A1* | 11/2012 | Schultz | G06F 17/30873 715/716 |
| 2013/0047059 A1* | 2/2013 | Phillips | G06F 17/24 715/203 |

* cited by examiner

00:00:00
NS
[Append]
00:01:00 ← — Transcriber initials — 402
AG
[Append]
00:02:00
[Append] ← — Button to Append Page — 404
00:03:00
[Append]
00:04:00
[Append]
00:05:00
[Append]
00:06:00 ← — Timestamps increased by 1 minute — 406
[Append]
00:07:00
[Append]
00:08:00
[Append]
00:09:00
[Append]
00:10:00
[Append]
00:11:00
[Append]
00:12:00
[Append]
00:13:00
[Append]
00:14:00
[Append]
00:15:00
[Append]
00:16:00
[Append]
00:17:00
[Append]

400

00:18:00
[Append]
00:19:00
[Append]
00:20:00
[Append]
00:21:00
[Append]
00:22:00
[Append]
00:23:00
[Append]
00:24:00
[Append]
00:25:00
[Append]
00:26:00
[Append]
00:27:00
[Append]
00:28:00
[Append]
00:29:00
[Append]

Task break-down for Rapid Transcription Process

| | Our Office | Transcriber 1 | Transcriber 2 | Transcriber 3 | Transcriber 4 | Transcriber 5 | Editor 1 | Editor 2 | Client |
|---|---|---|---|---|---|---|---|---|---|
| Before event | Create webpage for transcribers and Editors. Prepopulate Webpage with individual segments that correspond to anticipated time and length of recording. Include desired transcribing style and client keywords. Secure audio feed, and patch into recording computer. Set-up back-up recording computer. | Configures Express Scribe to automatically load from Tigerfish FTP site. Loads Webpage and reserves Segment 1. | Configures Express Scribe to automatically load from Tigerfish FTP site. Loads Webpage and reserves Segment 2. | Configures Express Scribe to automatically load from Tigerfish FTP site. Loads Webpage and reserves Segment 3. | Configures Express Scribe to automatically load from Tigerfish FTP site. Loads Webpage and reserves Segment 4. | Configures Express Scribe to automatically load from Tigerfish FTP site. Loads Webpage and reserves Segment 5. | Configures Express Scribe to automatically load from Tigerfish FTP site. | Configures Express Scribe to automatically load from Tigerfish FTP site. | Logs into password protected webpage. |
| Minute 1 | Record one minute audio Segment with 5 second overlap. | Express Scribe automatically downloads Segment 1, and continues to download subsequent segments at one minute intervals, as they are posted. Begins transcribing Segment 1. | Express Scribe automatically downloads Segment 1, and continues to download subsequent segments at one minute intervals, as they are posted. | Express Scribe automatically downloads Segment 1, and continues to download subsequent segments at one minute intervals, as they are posted. | Express Scribe automatically downloads Segment 1, and continues to download subsequent segments at one minute intervals, as they are posted. | Express Scribe automatically downloads Segment 1, and continues to download subsequent segments at one minute intervals, as they are posted. | Express Scribe automatically downloads Segment 1, and continues to download subsequent segments at one minute intervals, as they are posted. | Express Scribe automatically downloads Segment 1, and continues to download subsequent segments at one minute intervals, as they are posted. | First one minute audio Segment available to review if desired. |
| Minute 2 | Upload Segment 1 to FTP sites. | | Begins transcribing Segment 2. | | | | | | |
| Minute 3 | Upload Segment 2 to FTP sites. | | | Begins transcribing Segment 3. | | | | | |
| Minute 4 | Upload Segment 3 to FTP sites. | | | | | | | | |

FIG. 5

| | | | | | | | |
|---|---|---|---|---|---|---|---|
| Minute 5 | Upload Segment 4 to FTP sites. | Completes Segment 1. Posts transcript to Webpage in appropriate cell. Reserves Segment 6. | | | | | |
| Minute 6 | Upload Segment 5 to FTP sites. | | | Begins transcribing Segment 4. | Begins proofreading Segment 1. | | |
| Minute 7 | Upload Segment 6 to FTP sites. | Begins transcribing Segment 6. | Completes Segment 3. Posts transcript to Webpage in appropriate cell. Reserves Segment 7. | | Begins transcribing Segment 5. | Completes proofreading Segment 1. Posts to Second Webpage. | Fact-checks Segment 1 and posts to Client Webpage. | |
| Minute 8 | Upload Segment 7 to FTP sites. | | Begins transcribing Segment 7. | Completes Segment 2. Posts transcript to Webpage in appropriate cell. Reserves Segment 8. | Completes Segment 4. Posts transcript to Webpage in appropriate cell. Reserves Segment 9. | Begins proofreading Segment 3. | | |
| Minute 9 | Upload Segment 8 to FTP sites. | | Begins transcribing Segment 8. | | | Completes proofreading Segment 3. Posts to Second Webpage. Begins proofreading Segment 2. | | |
| Minute 10 | | Completes Segment 6. Posts transcript to Webpage in appropriate cell. Reserves Segment 11. | | Begins transcribing Segment 9. | Completes Segment 5. Posts transcript to Webpage in appropriate cell. Reserves Segment 10. | Completes proofreading Segment 2. Posts to Second Webpage. Begins proofreading Segment 4. Completes proofreading Segment 4. Posts to Second Webpage. Begins proofreading Segment 5 and 6. | Fact-checks Segment 3. Fact-checks Segment 2. Posts Segments 2 and 3 to Client Webpage. | Reviews first installation of transcript. |

FIG. 5 (Cont'd)

EDITING VIDEO USING A CORRESPONDING SYNCHRONIZED WRITTEN TRANSCRIPT BY SELECTION FROM A TEXT VIEWER

CROSS REFERENCE TO RELATED APPLICATIONS

This application is a continuation-in-part of U.S. Pat. No. 9,141,938, filed Oct. 30, 2012, and issued Sep. 22, 2015, which is a divisional application of U.S. Pat. No. 8,306,816, filed May 27, 2008, and issued Nov. 6, 2012, which claims benefit of U.S. Provisional Application No. 60/940,197, filed May 25, 2007, the entirety of all of which is incorporated herein by this reference thereto.

BACKGROUND OF THE INVENTION

Field of the Invention

The invention generally relates to audio/video editing. More particularly the invention is directed to a method and system for rapid audio/video editing using an associated written transcription.

Technical Background

Transcription is the rendering of the spoken word into written form. While this process goes back to the earliest examples of written poetry and narrative, this discussion will focus on the modern practice of transcription in the various disciplines that have need of it.

Thomas Edison invented the phonograph for the purpose of recording and reproducing the human voice, using a tinfoil-covered cylinder, in 1877. When Edison listed ten uses for his invention, the top item was "Letter writing and all kinds of dictation without the aid of a stenographer." Prior to this, a reporter would have to rely on contemporary notes, and the business world on secretaries trained to take shorthand and type up the notes later. Edison's invention created the possibility that something said in one location could later be transcribed elsewhere, with the additional benefit of repeated listening for greater accuracy. Since then, advances in the field of transcription have been closely tied to the development of recording technology.

By the 1930's, machines specifically designed for dictation and playback had become ubiquitous in American offices. Gradually cylinder-based machines gave way to tape, but until the 1990's the practice of transcription still required the physical delivery of recorded media from the location of recording to the location of transcription.

In the early 1990's, practitioners began to recognize and make use of the potential of the Internet and email in the practice of transcription. Whereas previously a transcript needed to be printed and delivered to a client, Internet email made it possible to simply attach a document in electronic form to an email message. Additionally, as tape recordings began to be replaced by digital media and businesses became more sophisticated in their use of the Internet, recordings destined for transcription could be uploaded to a secure web site and then downloaded by the transcriber.

In spite of these technological advances that have greatly eased the receipt and delivery of transcription materials, transcription of speech remains a cumbersome process that is of limited utility to clients for at least two reasons. The first reason is the amount of time required to transcribe speech into written form; the second has to do with the ability of clients to coordinate the original speech with the completed transcripts.

Transcription relies on the abilities of a trained professional to listen carefully, understand what is being said, and accurately transfer the content and nuance to the written page. To do this well requires a great deal of time. Digital recording and electronic communication have accelerated the transmission of recordings and delivery of transcripts, but a skilled transcriber still requires at least several hours to transcribe one hour of recorded speech. In this era of instant communication and an ever-accelerating need for information and materials, even this amount of time has begun to seem a roadblock to timely business interactions.

The second difficulty referred to above has to do with the difficulty of reconciling a written transcription with its recorded source. For example, a documentary filmmaker may shoot twelve rolls of interviews and have them transcribed in order to find the most useful footage. Even though the transcripts contain time-coding that is synchronized with the recordings, it can still be a cumbersome, time-consuming task for the filmmaker to go back and locate the desired footage based on the written transcript. Often, this sort of project involves many hours of footage arriving from different sources in various locations, thus compounding the problem.

Accordingly, there exists a great need in the art to reduce or eliminate the time inefficiencies imposed on clients by the labor-intensive nature of the conventional transcription process and the difficulty of reconciling the transcript with the source.

SUMMARY OF THE INVENTION

A network-based method and system for working with transcripts and corresponding video allows a media editor to rapidly edit video based on its corresponding written transcript, rapidly create amalgamated video from segments of multiple videos working from the corresponding transcripts, as well as assign attributes to video and audio and their corresponding written transcripts. The editor can quickly find and access portions of transcripts and the corresponding video segments within a single, multi-video project and across multiple projects. A network-based media editing workspace application allows the editor to access several workspace panels on his/her Internet browser. Workspace panels can slide into view, be hidden from view, and expand/collapse in size so that the editor can work with combinations of workspace panels to best meet the needs of the tasks he/she is performing. Each panel represents a step in a multi-step process that begins with a collection of videos and corresponding transcripts.

BRIEF DESCRIPTION OF THE DRAWINGS

FIG. 4 shows a main page from the system of FIG. 3.

FIG. 5 shows a matrix diagram illustrating workflow in a rapid transcription process.

DETAILED DESCRIPTION

Figure 1:
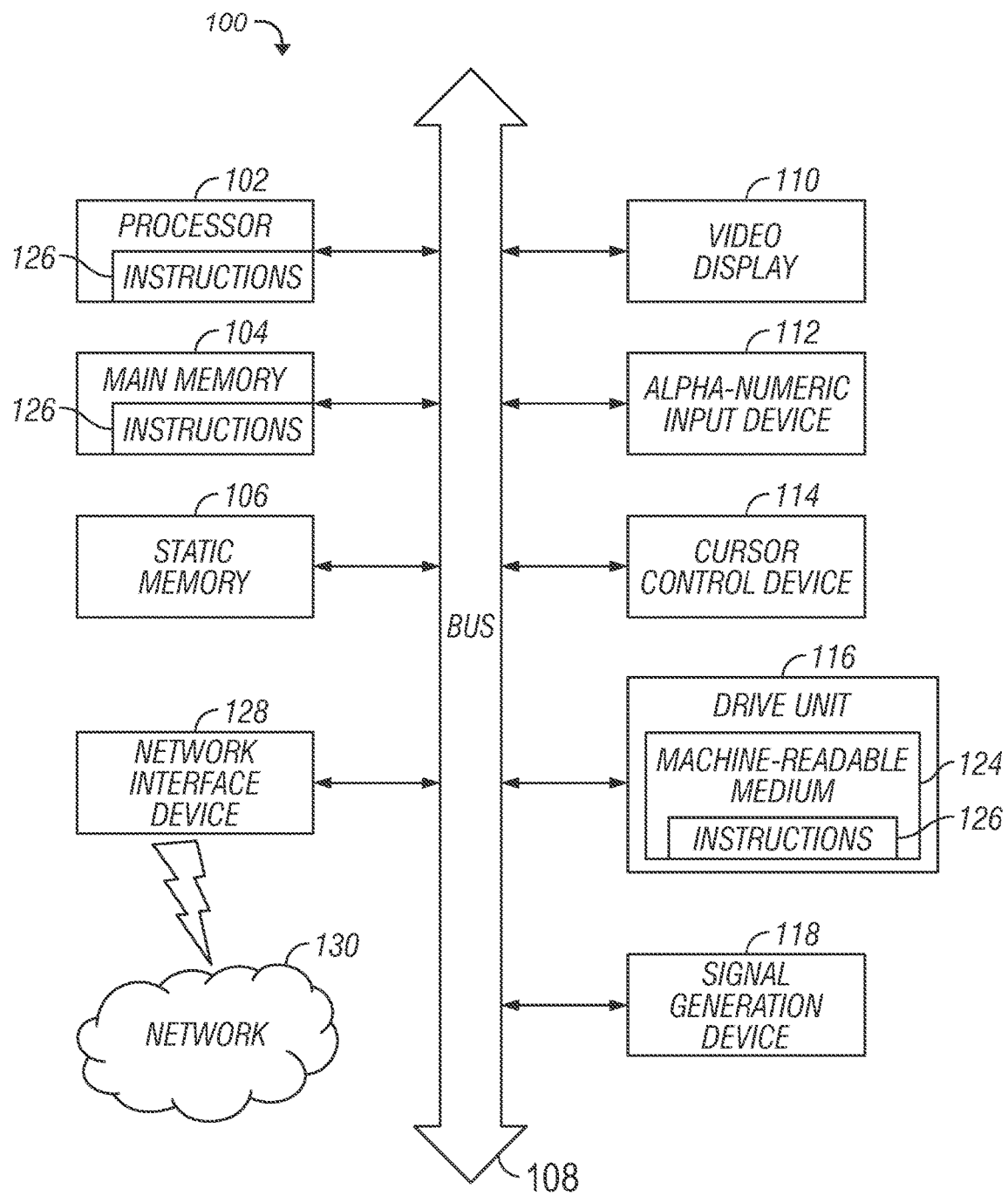
FIG. 1 provides a diagram of a machine in the exemplary form of a computer system within which a set of instructions, for causing the machine to perform any one of the methodologies discussed herein below, may be executed.

A method and system for producing and working with transcripts according to the invention eliminates the foregoing time inefficiencies. By dispersing a source recording to a transcription team in small segments, so that team members transcribe segments in parallel, a rapid transcription process delivers a fully edited transcript within minutes. Clients can view accurate, grammatically correct, proofread and fact-checked documents that shadow live proceedings by mere minutes. The rapid transcript includes time coding, speaker identification and summary. A viewer application allows an editor to view a video recording side-by-side with a transcript. Selecting a word in the transcript locates the corresponding recorded content; advancing a recording to a particular point locates and displays the corresponding spot in the transcript. The recording is viewed using common video features, and may be downloaded. The client can edit the transcript and insert comments. Any number of colleagues can view and edit simultaneously.

A network-based method and system for working with transcripts and corresponding video allows an editor to rapidly edit video based on its corresponding written transcript, rapidly create amalgamated video from segments of multiple videos working from the corresponding transcripts, as well as assign attributes to video and audio and their corresponding written transcripts (hereinafter, "audio/video is used as a shorthand to mean media comprising one or more of audio and video). The client can quickly find and access portions of transcripts and the corresponding video segments within a single, multi-video project and across multiple projects. A network-based workspace application allows the client to access several workspace panels on his/her Internet browser. Workspace panels can slide into view, be hidden from view, and expand/collapse in size so that the client can work with combinations of workspace panels to best meet the needs of the tasks he/she is performing. Each panel represents a step in a multi-step process that begins with a collection of videos and corresponding transcripts.

An embodiment allows the client to create a final video that may be an edited version of a single video source or may be an amalgamated video that includes segments from multiple video sources. The client may step through multiple iterations of this process going forward and backward through the workspace panels until they have completed a final version of their edited and amalgamated video.

An embodiment allows the client to assign attributes to transcripts and portions of transcripts for content using any number of client-defined criteria as well as comment on the transcript pieces. With this capability clients may create a knowledge base and/or content-based library to suit their specific needs and then use the corresponding topic specific transcripts/videos as they see fit.

An embodiment may give the client the ability to select specific panels to view and work with by sliding panels on and off screen and expanding and/or collapsing panel sizes.

An embodiment supports the use of multiple monitors.

All of the above functionality can also be applied to audio files and their corresponding transcripts, with the exclusion of the video component. The same applies to one or more of the embodiments described herein below.

Hardware Implementation

Referring now to FIG. 1, shown is a diagrammatic representation of a machine in the exemplary form of a computer system 100 within which a set of instructions for causing the machine to perform any one of the methodologies discussed herein below may be executed. In alternative embodiments, the machine may comprise a network router, a network switch, a network bridge, personal digital assistant (PDA), a cellular telephone, a web appliance or any machine capable of executing a sequence of instructions that specify actions to be taken by that machine.

The computer system 100 includes a processor 102, a main memory 104 and a static memory 106, which communicate with each other via a bus 108. The computer system 100 may further include a display unit 110, for example, a liquid crystal display (LCD) or a cathode ray tube (CRT). The computer system 100 also includes an alphanumeric input device 112, for example, a keyboard; a cursor control device 114, for example, a mouse; a disk drive unit 116, a signal generation device 118, for example, a speaker, and a network interface device 128.

The disk drive unit 116 includes a machine-readable medium 124 on which is stored a set of executable instructions, i.e. software, 126 embodying any one, or all, of the methodologies described herein below. The software 126 is also shown to reside, completely or at least partially, within the main memory 104 and/or within the processor 102. The software 126 may further be transmitted or received over a network 130 by means of a network interface device 128.

In contrast to the system 100 discussed above, a different embodiment of the invention uses logic circuitry instead of computer-executed instructions to implement processing offers. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large scale integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments of this invention may be used as or to support software programs executed upon some form of processing core (such as the Central Processing Unit of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Terminology

An 'Event' is defined herein as the original audio/video provided by the client together with the resulting corresponding transcripts that are furnished to the client. Each event may be given a unique name, such as "Best Practices Interviews", and typically contains multiple audio/video files.

A client is one who desires transcription of an event. Typically, the client owns the media of an event and may contract a transcription service to provide a transcription of and synchronized with the media that captures the event.

A transcriber is one who uses the transcription workspace tools to produce at least a partial transcription of one or more media assets. The client may perform transcription using the transcription workspace tool, or a transcriber may be employed by a company providing transcription services to a client.

A transcription editor is one who assembles all of the partial transcriptions for an event as requested by a client. The transcription editor may cross-reference transcribed material against recorded segments, review each of the partial transcriptions, and perform fact checking.

A media editor (also called video editor) uses the event assets together with the transcription artifacts to easily create an amalgamated video that may include portions of one or more events. The client may use the media editing workspace as a media editor, or a media editor may be employed by a company that performs media editing services.

A 'project' is defined herein as a work item including one or more events or portions of events where the contents of the event(s) have been manipulated and saved as a finished work piece. For example, the client may take the videos from the event, "Best Practices Interview", and select portions from each of the videos in the project and piece them together to create a single, amalgamated video. This new project may be uniquely named based on the more refined subject matter, such as "Best Practices—Customer Service."

A 'project piece' as used herein is a portion of a transcript/video taken from an event and copied into a project. A project may contain project pieces taken from any number of events. Project pieces can be arranged in a specific sequence within the project.

A 'project section' as used herein is a collection of contiguous project pieces within a single project. The contiguous project pieces can be identified and named as a project section by the client. The project section may then be rearranged and acted upon as a whole within the project.

A 'tagg' is an object representing a portion of the video. A tagg identifies the start and end positions of the video portion in the textual transcript and in the video source.

A 'label' is defined herein to be any word or phrase created and applied to a portion of a transcript in order to uniquely identify that transcript piece and/or its corresponding video. Labels may include but are not limited to: speaker identity, speaker sex, date of interview, topics covered, political identification, income, discussion of facts relevant to a legal proceeding, etc. One or more labels may be assigned to a tagg. For example, a video clip of a discussion between Barack Obama and Vladimir Putin may be associated with labels "US President", "Barack Obama", "Russian President", and "Vladimir Putin". A single label may be associated with more than one tagg. For example, a clip of President Bush's 'Mission Accomplished' speech may also be assigned the label "US President."

Labels once applied can then be used to search for specific videos/transcripts and in particular, specific portions of videos/transcripts.

A 'label whitelist' is used herein to refer to a collection of labels that is saved and uniquely named for use on future projects.

When the generic terms "project" or "projects" are used, they refer to both events and projects.

Architectural Overview

Figure 22:
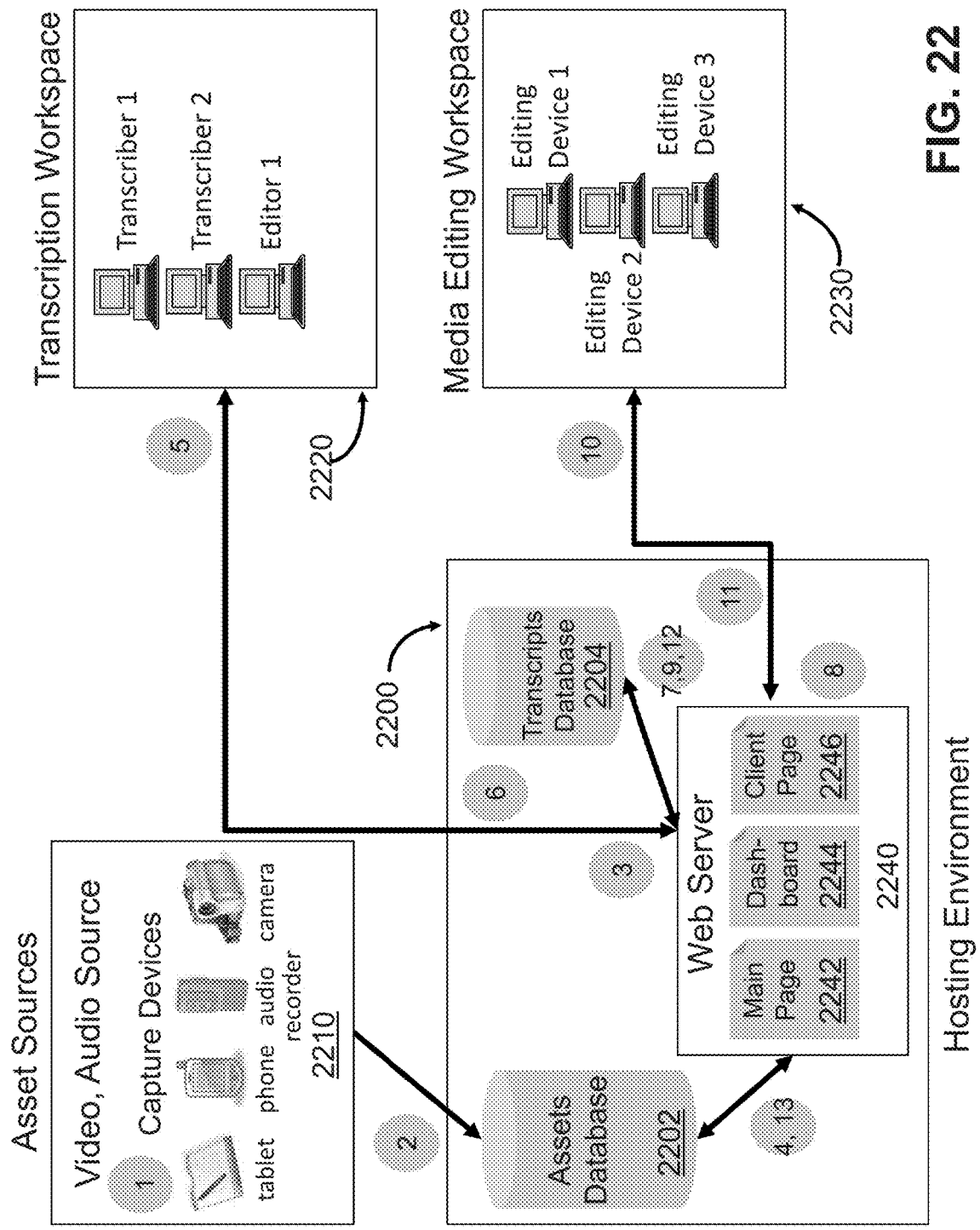
FIG. 22 is a high level architecture diagram showing the interaction among components of the audio/video transcription and editing system, according to an embodiment of the invention.

FIG. 22 is a high level architecture diagram showing the interaction among components of the audio/video transcription and editing system, according to an embodiment of the invention. In particular, FIG. 22 illustrates the flow of data through the system at a high level of abstraction. The system comprises Asset Sources 2210, Hosting Environment 2200, Transcription Workspace 2220, and Media Editing Workspace 2230. In Step 1, an event may be captured as audio/video by a recording device such as a tablet, a phone, a camera, or an audio recorder. Once the live analog signals are digitized and stored on a persistent media in one or more of the recording devices, the digitized recording may be stored in an Assets Database 2202 (Step 2). Hosting Environment 2200 represents the provisioning and management of the IT infrastructure where the backend system stores assets and provides a transcription and editing web service. The hosting environment 2200 may be outsourced and hosted in a cloud or it may be managed within the service provider's data center. Assets Database 2202 may store the recorded audio and video that will be transcribed and edited. A transcriber may use transcription device running a web browser to request web page Dashboard 2244 that provides access to the transcription dashboard (Step 3). The transcription dashboard provides the transcription functionality including requesting assets to transcribe (Step 4), tools to transcribe the audio and video to a textual representation (Step 5), and uploading transcription artifacts such as project lists, transcriptions, and taggs to the web server (Step 6). When uploaded from the transcription device to the web server, the web server stores the transcription artifacts in the Transcripts Database 2204 (Step 7).

A transcription editor may then retrieve the individual transcript segments into a single document. The transcription editor may access the independent transcription artifacts together with the source assets to create a single transcription of an event.

The Media Editing Workspace 2230 works similarly to the Transcription Workspace 2220. A media editor may use an editing device running a web browser to request web page dashboard 2244 that provides access to the editing dashboard in Step 8.

When the web server 2240 receives a request to return transcription artifacts, in Step 9 the desired artifacts are retrieved from the transcripts database 2204 and sent to the browser running on the requesting editing device (one of 2232, 2234, or 2236) in Step 10. The editor uses the editing functionality to create an edited source and corresponding transcript that are uploaded to the web server at Step 11. New or updated transcript artifacts may be stored in the transcripts database 2204 in step 12, and edited source may be stored in assets database 2202 in step 13.

Transcription Services

Figure 2:
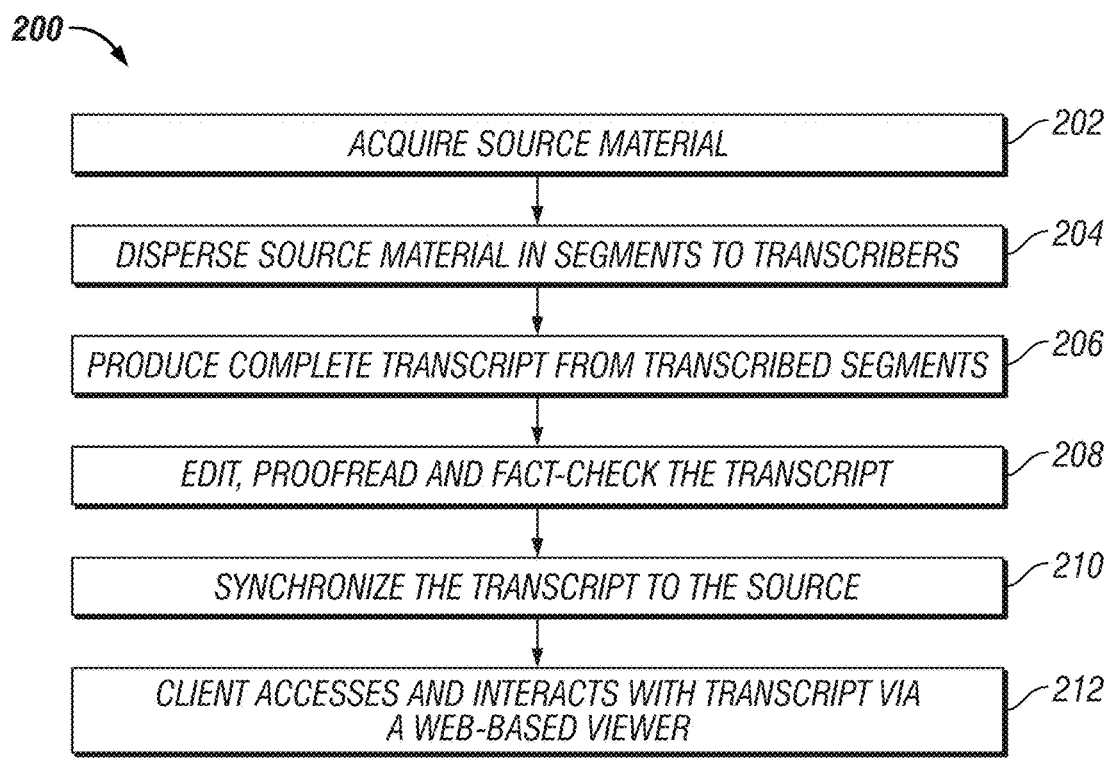
FIG. 2 provides a schematic diagram of a method for rapid transcription.

Turning now to FIG. 2, in overview, a method 200 for rapid transcription may include at least one of the following steps:

Rapid Transcript:
  acquire source material 202;
  disperse source material in short segments to transcribers 204;
  produce transcript from the transcribed segments 206;
  edit, proofread and fact-check the transcript 208;
Synch:
  synchronize the transcript to the source material 210; and
  client accesses and interacts with the transcript via a web-based viewer 212.

The rapid transcript process is used to create, within minutes, a written transcript of taped or live proceedings. The transcript is posted, in incrementally updated segments, on a web page accessible by the client. The client can read the text directly from the web page, as well as download recordings of the event and copies of the transcript in a series of continually updated documents.

Rapid transcript is useful for creating written transcripts of the following types of events:
  financial conference calls:
  basic conference calls;
  interviews for television or documentary film production;
  conventions and meetings;
    keynotes;
    breakout sessions;
    panel discussion;
  legal proceedings;
    depositions;
    hearings;
    witness interviews and examinations;
  transcription of broadcast for placement on Internet;
    candidate debates;
    press conferences; and
  previously recorded sessions requiring immediate transcription.

Rapid transcript employs a novel system configuration that allows a provider to quickly disperse short segments, for example, one minute in length, of a live event or recording to any number of transcribers. This allows each member of a team of transcribers to be simultaneously working on a given segment of recorded material. Thus, if it takes a single transcriber one hour to transcribe a fifteen-minute recording, a team of five transcribers can have the entire segment transcribed, edited, and posted to a web site within twenty minutes. In the case of a live event, this means that participants in a meeting or on a conference call, for example, can be viewing an accurate, grammatically correct, proofread and fact-checked document that shadows the live proceedings upon which it is based by mere minutes. This transcript may include time coding, speaker identification, and a summary of important points. The transcript can be delivered via email or through a secure web page, giving clients easy access via computer or handheld device.

Figure 3:
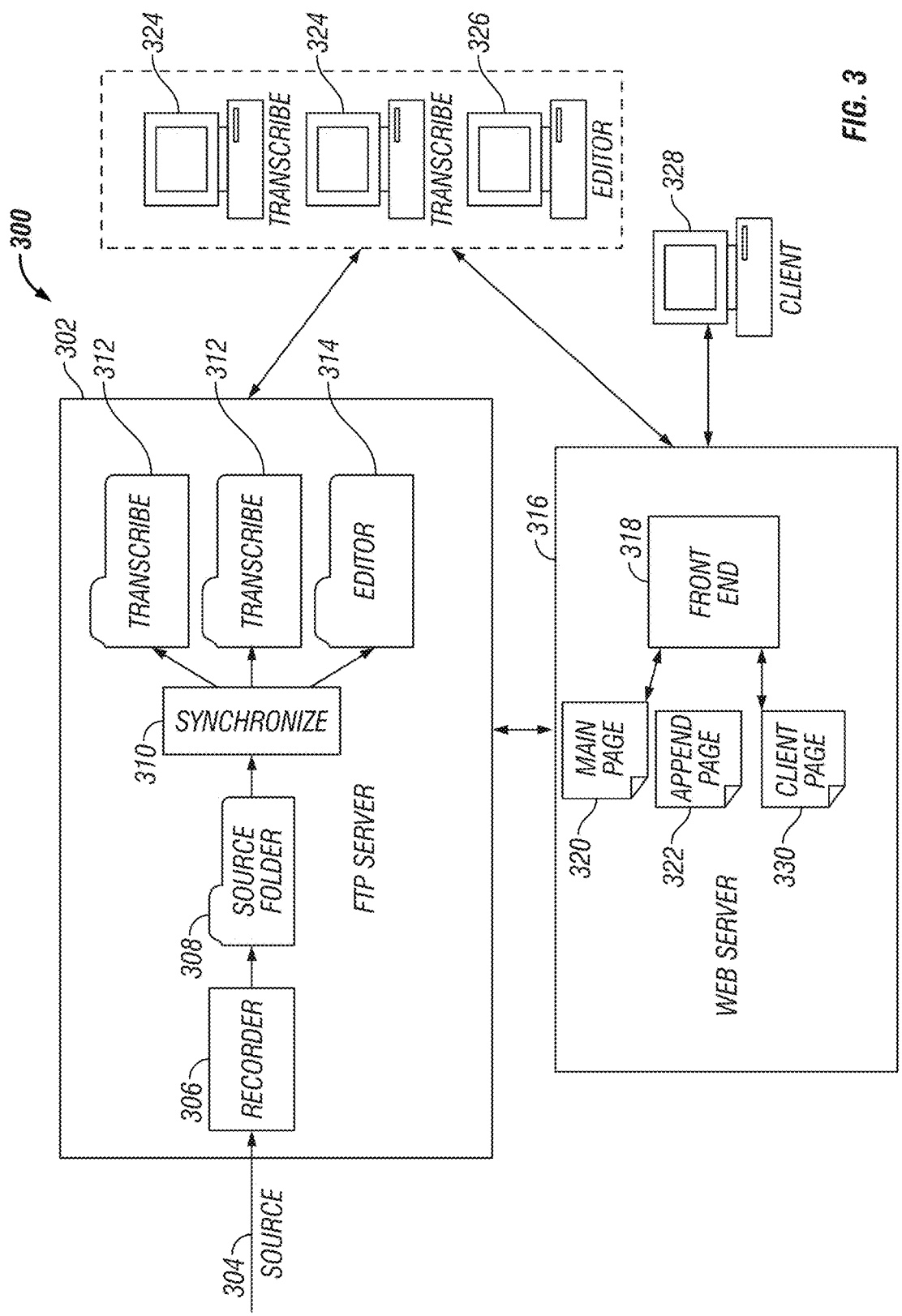
FIG. 3 provides a schematic diagram of a network-based system for producing and working with transcripts.

Referring now to FIG. 3, shown is a schematic diagram of a system 300 for rapid transcribing. At a provider's location, an FTP (file transfer protocol) server 302 receives source material 304 in the form of audio input from any source. The server may encode the audio portion of the source material into audio files, such as mp3 format or various other compressed media formats. Audio may arrive via the Internet using VoiceOverIP (VOIP), various streaming media, or SHOUTCAST (AOL LLC Dulles, Va.) software. Audio may also arrive via landline telephone or cell phone connection.

The audio signal is converted into segments of predetermined, configurable length, one minute, for example, by a recording system 306, such as the VRS recording system (NCH SOFTWARE PTY. LTD., Can berra, Australia). Each audio segment may be saved to a source folder 308 with a filename that includes a unique alphanumeric code identifying the client and project, followed by the year, month, day, hour, and minute of the segment.

Any number of individual, password-protected folders 312, 314 is established on the FTP server for each transcriber and editor. A synchronization module 310 copies the audio segments from the source folder and pastes a copy of each one into each Transcriber's 312 and Editor's 314 FTP folder. In one embodiment, SYNCTOY (MICROSOFT CORPORATION, Redmond, Wash.) fills the role of synchronization module. When copying files from the source folder 308 to the transcriber and editor folders 312, 314, using SYNCTOY'S 'combine' synchronization method assures that files exist at both locations, while deleted and renamed files are ignored. Using such a synchronization method is preferred in this case because, as explained below, during the production process, as transcribers transcribe audio segments downloaded from the FTP server, the segments are deleted from transcriber's folder. The use of a synchronization method that ignores deleted files assures that system resources are not wasted copying files from the source folder 308 unnecessarily.

The transcriber stations 324 and editor station 326 are typically, but not necessarily, located off-site. A transcriber station 324 typically constitutes a computational device programmed to enable transcription of human speech. In one embodiment, the computational device is programmed with transcribing software, such as EXPRESS SCRIBE (NCH SOFTWARE PTY., LTD.). Additionally, the transcriber station 324 includes a transcriber operating the computational device to transcribe downloaded segments.

An editor station 326 typically constitutes a computational device programmed to enable activities such as editing, proofreading and fact-checking. Additionally, the editor station includes an editor using the computational device to perform the activities of an editor.

In FIG. 3, the Transcriber Stations 324 and Editor Station 326 are surrounded by a dashed line for ease of representation to indicate the similarity of their status as clients to the web server 316 and the FTP server 302. Double-headed arrows between the transcriber stations and editor station and the servers are included to illustrate the bidirectional data flow between the clients and the servers. The dashed line is not intended to indicate that the client, in the form of transcriber stations 324 and/or editor station 326 are disposed at the same location, although they could be.

A web server 316 includes a front end 318 that manages authentication to the main page 320—described in greater detail below. Whenever a transcriber arrives at the main page URL, the log-in action through a 'before_filter' verifies a browser's session user ID against those stored at the web server 316. If verification fails, the browser is redirected to a login page. If the browser authenticates successfully, the browser is redirected to the main page.

Preferably, a new, password-protected web page is created for each Rapid Transcript project that may include: one or more main pages 320 for use by the transcribers, one or more append pages 322, and one or more client pages 330 upon which the final edited transcript is posted.

FIG. 4 shows an exemplary main page 400. As shown in FIG. 4, the main page 400 includes an alternating sequence of time stamps 406 and buttons 404. The main page 400 is refreshed at regular intervals, one minute, for example. As in FIG. 4, the initial time stamp in the main page preferably starts at 00:00:00. Each subsequent time stamp in the time stamp sequence is incremented by fixed interval, for example, one minute, until the sequence reaches the duration of the recorded source material. The time stamps are preferably displayed in HH:MM:SS format. As shown, time stamps 406 alternate with buttons on the page.

Clicking one of the buttons redirects the browser to an append page 322 that is associated with the time stamp above the button. An append page contains a text field and a text field 'submit' button. It is to be noted here that portions of an embodiment of the present application employ a model-view-controller development framework, for example "Ruby on Rails", wherein the "model" is understood to constitute a data model, the "view" constitutes a user interface and the "controller" constitutes the application's control logic. However, other programming approaches and/or development frameworks can be employed to implement the system herein described and are within the scope of claims. The text field 'submit' button, when clicked, submits the text field input to an action which then passes the input to a model, which, in turn, adds the input to a data structure, such as a table, which is associated with a particular time stamp. Transcribers can press a button to "claim" a segment for transcription associated with a given audio segment. In this way, a group of transcribers is able to spontaneously organize itself for maximum efficiency.

For example, as shown in FIG. 4, the first two time stamps bear the transcriber initials "NS", and "AG", respectively. Thus, those two segments have been claimed by the transcribers identified by the initials "NS" and "AG." As above, the transcriber may claim a time stamp by clicking the 'append' button for the time stamp, which navigates the transcriber to the 'append' page 322 for the time stamp. Upon gaining access to the 'append' page, the transcriber may enter his/her initials in the text field, and click the 'submit' button, whereupon the transcriber's initials are entered into the data structure for the time stamp and subsequently displayed on the 'append' page. In one embodiment, as shown in FIG. 4, the transcriber's initials appear above the 'append' button for the time stamp.

As previously described, recorded segments are written to the transcriber folders 312 on the FTP server 302. In order to download the recorded segments to a transcribing station 324, the transcriber sets up an automated incoming FTP connection. The transcribing software on the transcription station is then configured to authenticate and check for new files in the transcriber's folder 312, at regular intervals of, for example, one minute. As new files become available, they are automatically downloaded to the transcription station 324. Whenever the transcription station downloads new files over the FTP connection, the transcriber can choose to transcribe a new audio file. In actual practice, the transcriber transcribes only files that the transcriber has claimed by means of the foregoing reservation process.

The transcriber looks for the claimed file among the downloaded audio files and transcribes the claimed file.

After finishing the transcription, the transcriber may then upload the transcription by the previously described process for submitting input: he/she navigates to the main page 320, clicks the 'append' button 404 for the particular time stamp. Clicking the 'append' button navigates the transcriber to the 'append' page 322 for the time stamp. The transcriber then pastes the transcript into the text submit box for the time stamp, clicks the 'submit' button and the text of the transcript is submitted in the manner previously described. Subsequently, the transcriber's browser is then navigated to the main page 320 to claim another time stamp. In this way, a rough draft of the source material is produced by a team of transcribers working in parallel.

It should be noted that the Rapid Transcript process can also make use of stenography or voice recognition software to produce this initial rough draft.

If a staff member is observing a live meeting involving multiple speakers, he/she may also log-on to the main page 320, and take notes regarding the speaker ID directly on the web page. Transcribers can consult this speaker ID log while transcribing.

The next step is to edit the individual segments into a single document. An editor logs on to the project website, copies transcribed text from one or more cells (text from more than one cell can be copied in one swath), and edits the text. The editor listens to the audio segments and cross-references the transcribed material against the recorded segments. If the material at this point is ready for the client, the editor uploads the edited transcript to the Client web page. If the material requires additional fact-checking, the editor can upload the edited transcript to a second web page, where another reviews the material and checks facts.

The Rapid Transcript Web Page

A client begins by logging on to the provider's password protected website. This brings the client to a dedicated web page containing a list of the client's projects. More will be said about the client page herein below. Any number of people associated with a given project may be logged on concurrently.

The web page created for the client includes the transcript, with time coding, side by side with a column containing a summary, if requested. Links to the one-minute audio or video segments are provided, as well as a link to a recording of the entire proceeding. As well as reading from the website, the client is able to download the transcript in either PDF or word-processing file formats. The transcript can also be sent by email directly from this web page.

Translation

The rapid transcript method can be utilized in translation as well. For a session that includes a translator, the client's web page typically displays three main columns: transcription in the original language, the translator's words, and the provider's own expert translation.

Turning now to FIG. 5, shown is a matrix depicting an exemplary workflow for the rapid transcript process. The timeline shown in FIG. 5 is merely illustrative and is not intended to be limiting. The following description proceeds by describing the role of each of the parties at each point on the timeline.

Initially, before an event, a number of preparatory activities are carried out, by the provider, the transcribers and the editors. The provider for example may perform any of:
  Creating a web page for the transcribers and the editors;
  Pre-populating the web page with individual segments that correspond to the anticipated time and length of recording;
  Specifying in the page the desired transcribing style and client keywords;
  Securing an audio feed and patching into the recording computer; and
  Setting up a backup recording computer.

Each of the transcribers and editors may also have a preparatory role. For example, each may need to configure his or her audio playback software to download recorded segments. Additionally, each transcriber claims at least one segment. Finally, the client, in anticipation of the event, may log onto a password protected web page. More will be said about the client's page below.

At minute 1, the provider records the first segment of the speech that is to be transcribed. In one embodiment, the segment length is set at one minute. However, segment length is a configurable parameter and thus, the exemplary segment length of one minute is not intended to be limiting. It should be noticed that the segments are recorded with an overlap in order to prevent loss of material. In one embodiment, the overlap is configured to be five seconds in length.

At minute 2, the provider uploads segment 1 to the FTP site. Transcriber 1 downloads segment 1 and begins transcribing it. The remaining transcribers download subsequent segments as they become available. The client may, from their web site, review the audio of segment 1.

At minute 3, segment 2 is uploaded to the FTP site and transcriber 2 begins transcription of segment 2.

At minute 4, the provider uploads segment 3 and transcriber 3 begins transcribing segment 3.

At minute 5, the provider uploads segment 4 to the FTP site. Transcriber 1 completes transcription of segment 1. Transcriber posts the transcript to the web page in an appropriate cell and claims segment 6. Transcriber 4 begins transcription of segment 4. Editor 1 begins proofreading of segment 1.

At minute 6, the provider uploads segment 5 to the FTP site and transcriber 5 begins transcription of segment 5. Editor 1 completes proofreading of segment 1 and posts the proofread transcription to a second web page.

At minute 7, the provider uploads segment 6 to the FTP site and transcriber 1 begins transcription of segment 6. Transcriber 3 may complete transcribing of segment 3 and posts the transcript to the web page in the appropriate cell. Transcriber 3 then claims segment 7. Editor 1 begins proofreading segment 3. Editor 2 fact-checks segment 1 and posts to the client web page.

At minute 8, the provider uploads segment 7 to the FTP site. Transcriber 2 may finish with segment 2 and post it to the web page in the appropriate cell, and then claim segment 8. Transcriber 3 may begin transcribing segment 7. Transcriber 4 may begin transcribing segment 4 and posts it to the web page in the appropriate cell. Transcriber 4 then may claim segment 9. Editor 1 completes proofreading segment 3 and posts the proofread transcript to the second web page. Editor 1 may then begin proofreading segment 2. The client may review the first installation of the transcript.

At minute 9, the provider uploads segment 8 to the FTP site. Transcriber 2 may then begin transcription of segment 8. Editor 1 typically completes segment 2 by this time and posts it to the second web page. Editor then proceeds to proofread segment 4. Editor 2 fact-checks segment 3.

At minute 10, there may remain no further segments to upload. Transcriber 1 completes segment 6 and posts it to the web page in the appropriate cell. Transcriber 5 completes segment 5 and posts the transcript to the web page in an appropriate cell. Editor 1 completes proofreading segment 4 and posts to the second web page. Editor 1 then begins proofreading segments 5 and 6. Editor 2 fact-checks segment 2 and posts segments 2 and 3 to the client web page.

At minute 11, Editor 1 completes proofreading segments 5 and 6. Editor 2 begins and completes fact-checking segment 4. The second installation of the transcript is available to the client, containing segments 1-3.

At minute 12, Editor 2 begins and completes fact-checking segments 5 and 6. The workflow proceeds in such fashion until all segments have been transcribed, edited and fact-checked and reviewed by the client. The rapid transcript process may terminate, for example, approximately five minutes after the end of a live event with the delivery of a completed transcript. Additionally, the client may download the audio and/or video of the entire event from the client's project web site. Additionally, the transcript may be downloaded as a word-processing or .PDF file, or sent via email.

As described above, the usefulness of a conventional transcript to the client is limited because the transcript is not synchronized to the source content. Therefore, the client must spend a great deal of time searching through the transcript and the source material in order to reconcile them to each other. In order to eliminate this cumbersome chore, transcripts are synchronized to the source material.

The Synch tool links a written transcript to its source material. In one embodiment, the process of linking transcript and source material follows the rapid transcript process, either immediately or at some unspecified future time.

In another embodiment, the synchronization process can be applied to any conventional transcript produced from audio and/or video source material. A web page allows an editor to view a video recording, for example, side-by-side with a transcript of the video's audio content. In one embodiment, the client sees four main items on the screen: a video, a transcript, a list of projects, and a "tagg" table. A tagg is an object representing a memo of description created by the client that describes the contents of a portion of the video. In this way, the client is provided a means for reviewing and making decisions concerning audio or video recording by means of a transcript which is linked to the recording. Multiple recordings can thus be categorized and referenced; a particular phrase can be located in the written transcript and immediately reviewed in the recording.

Each point in the recording is synchronized to the corresponding text in the written transcript, so that selecting a word in the transcript automatically locates the corresponding spot in the recording. Conversely, advancing a recording to a particular point automatically locates and displays the corresponding text in the transcript. The recording can be viewed using common video viewing features (play, stop, skip forwards and backwards, play at various speeds, etc.), and may be downloaded. The client can read and edit the written transcript, and insert comments. Any number of colleagues can be using this service to work on a series of transcripts simultaneously.

To synchronize the source material with the transcript, the source material is generally converted to a media player file format, if necessary. One embodiment converts source videos to the QUICKTIME (APPLE, INC., Cupertino Calif.) video format. The ordinarily skilled practitioner will also appreciate that the QUICKTIME application can also play many other types of media files, such as MPEG, MP3 and WAV. Thus, audio files can also be rendered in a format compatible with the QUICKTIME player.

As previously described, one or more transcribers create a transcript of the source material, typically using a word processing application such as WORD (MICROSOFT CORPORATION). At the time the transcription is created, the transcriber(s) place(s) time code markers in the transcript. If necessary, the transcript may be re-formatted using a text editor, such as TEXTPAD (HELIOS SOFTWARE SOLUTIONS, Longridge, UK). Using a media transcription application such as INQSCRIBE (INQUIRIUM, LLC, Chicago, Ill.) the media file is combined with information about the embedded time codes in the transcript. The transcript is then further formatted to convert into a table wherein the time codes and the written words in the transcript are associated with each other in a one-to-one relationship. In one embodiment, converting the transcript to a table is accomplished by using a spreadsheet application, such as EXCEL (MICROSOFT CORPORATION) to format the transcript into cells consisting of time codes and transcript words. Each cell from the spreadsheet file then becomes a field in the database table. The words of the transcript are associated to the appropriate segment of source content by means of the time codes. As described below, a project includes a database, wherein the transcript tables are stored. When the client selects a project to view, as described below, the transcript is reconstituted by displaying the words stored in the database in the correct order.

As previously described in relation to the time code process, a web page is created for each project. The project web site preferably includes at least one password-protected client page 330 wherein the client is able to view the transcript.

Media Editing

Figure 6:
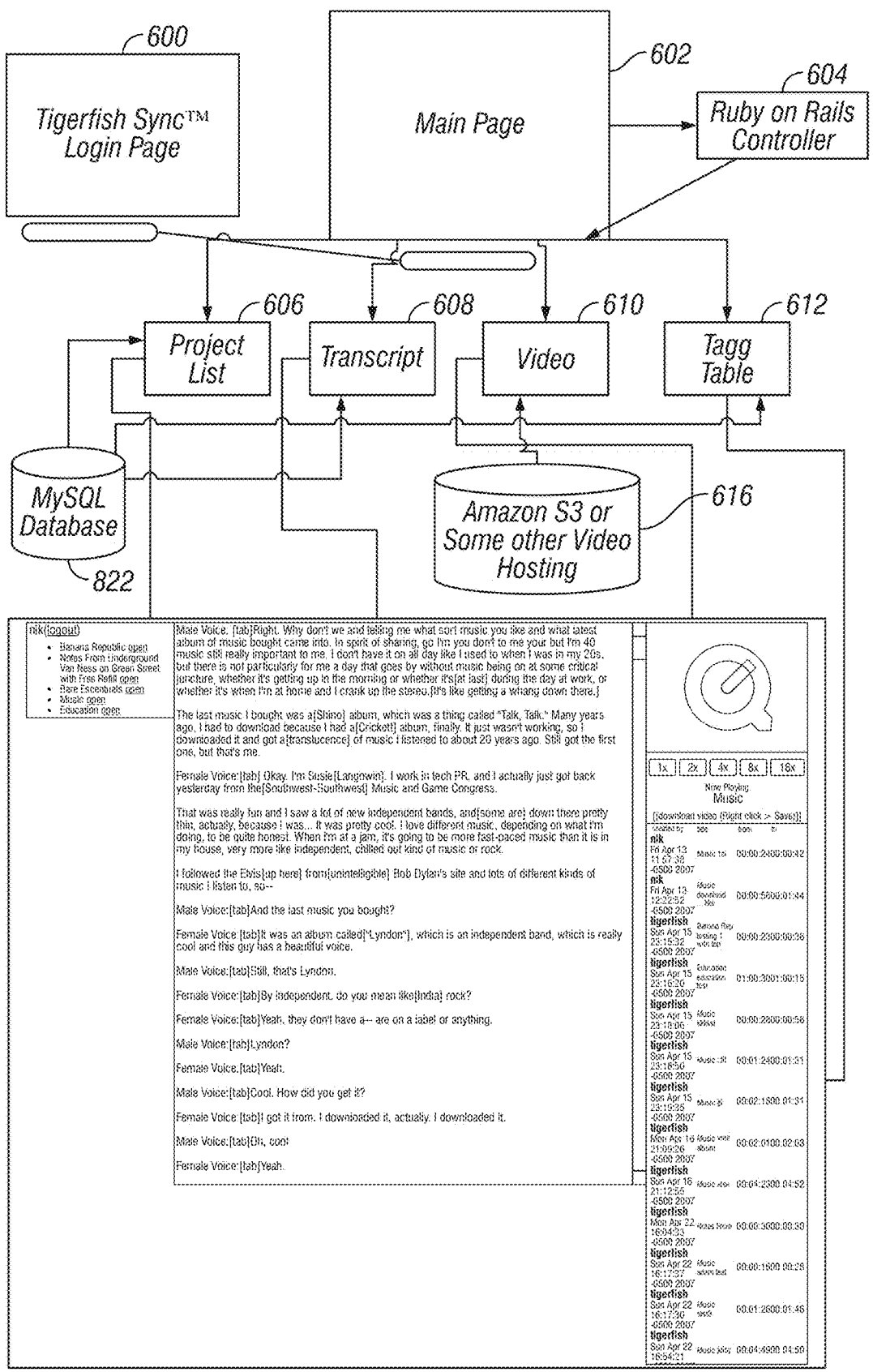
FIG. 6 shows a schematic diagram of the functional architecture of a system for working with transcripts.
Figure 7:
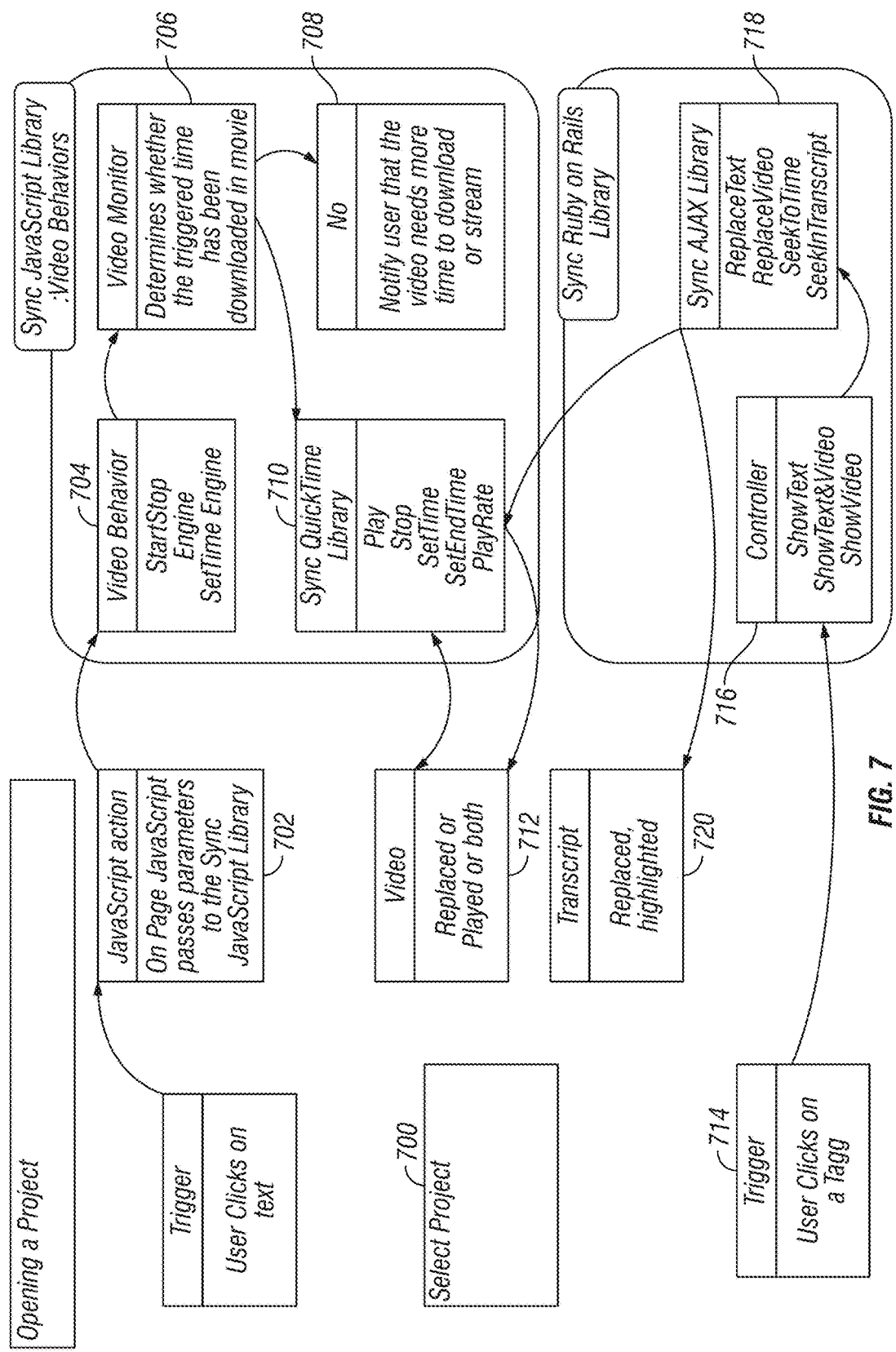
FIG. 7 provides a flow diagram of a sub-process for opening a project.
Figure 8:
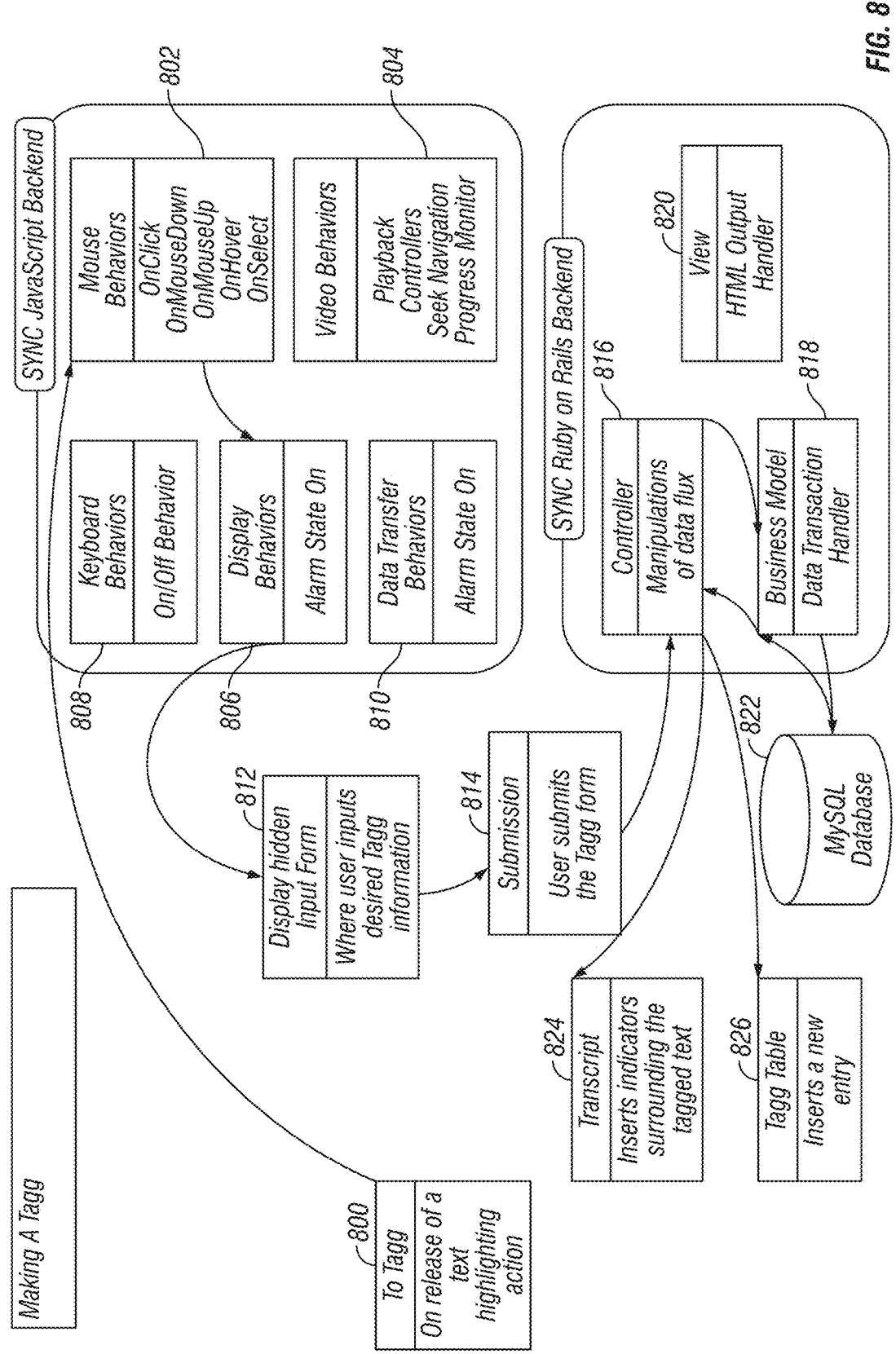
FIG. 8 provides a flow diagram of a sub-process for making a tagg.
Figure 9:
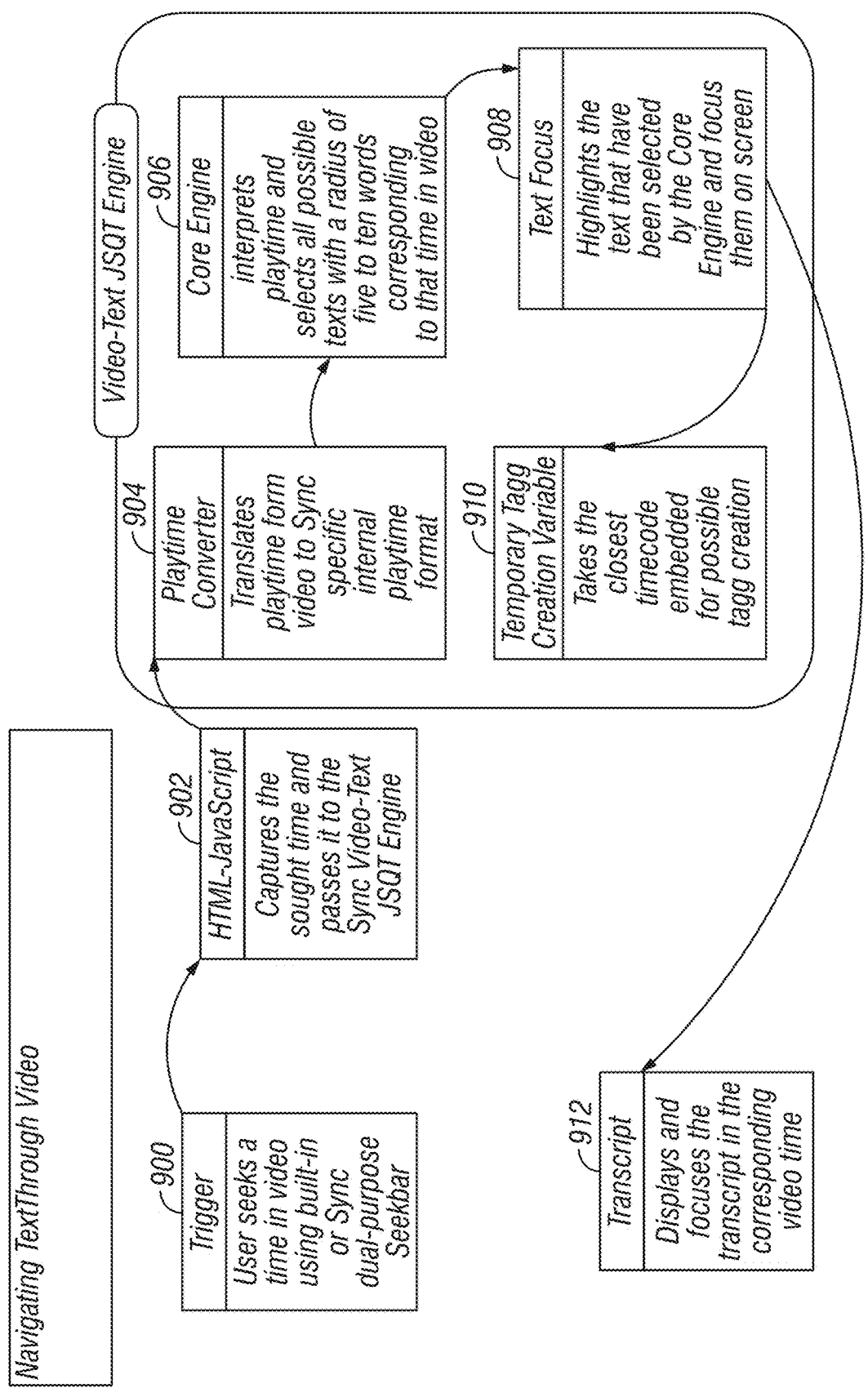
FIG. 9 provides a flow diagram of a sub-process for navigating text through video.
Figure 10:
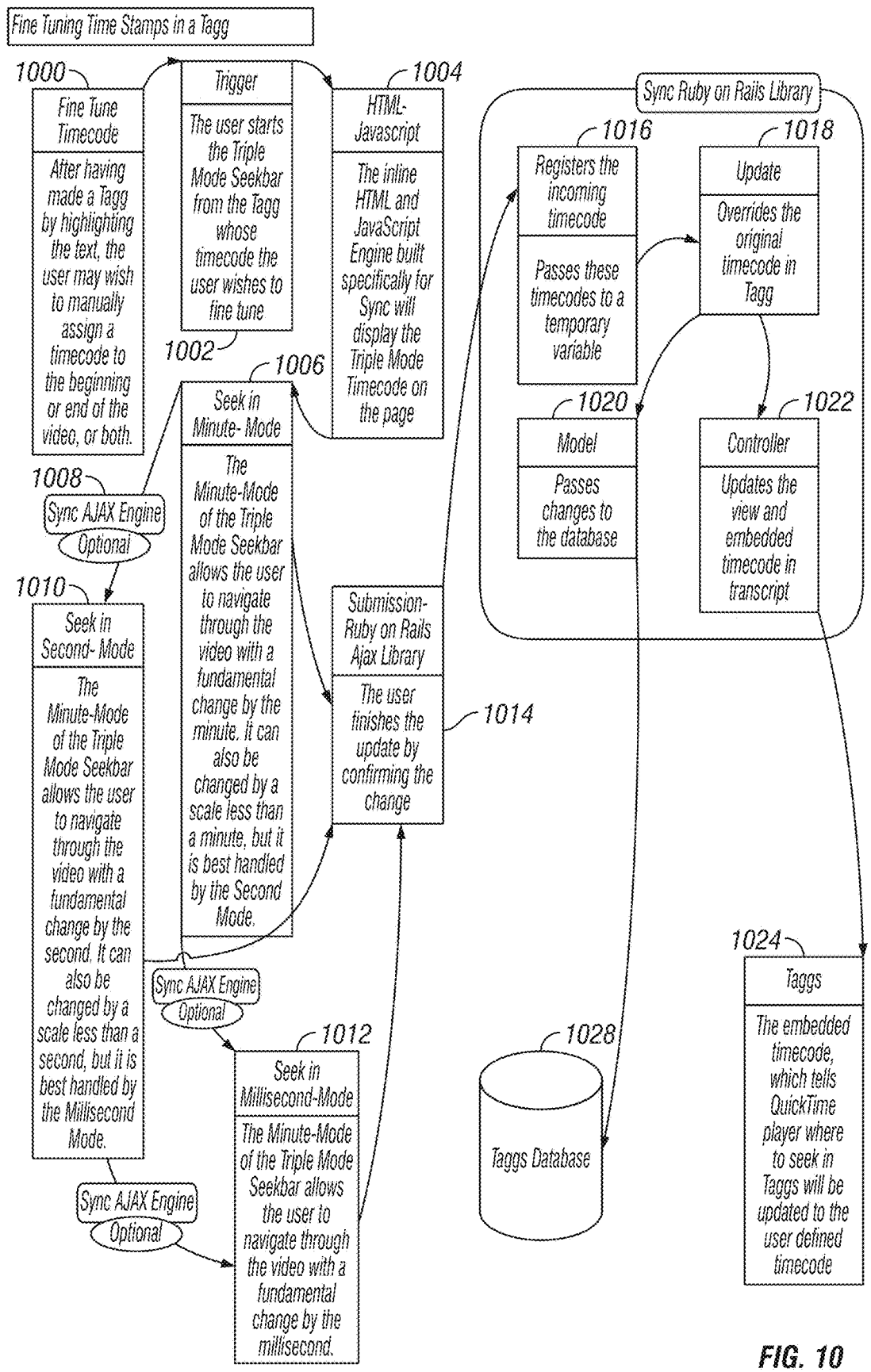
FIG. 10 provides a flow diagram of a sub-process for fine-tuning time stamps in a tagg.

A user of the audio/video editing service may begin by logging on to the password-protected web site. The main interface comprises a client page 330 that displays a detailed view 602 as shown in FIG. 6. Detailed view 602 may contain a list of projects accessible to the user. In one embodiment, the main interface includes one or more of the following sections: Project List 606; Transcript 608; Video 610; and Tagg table 612.

Any number of people associated with a given project may be logged on concurrently.

Figure 11:
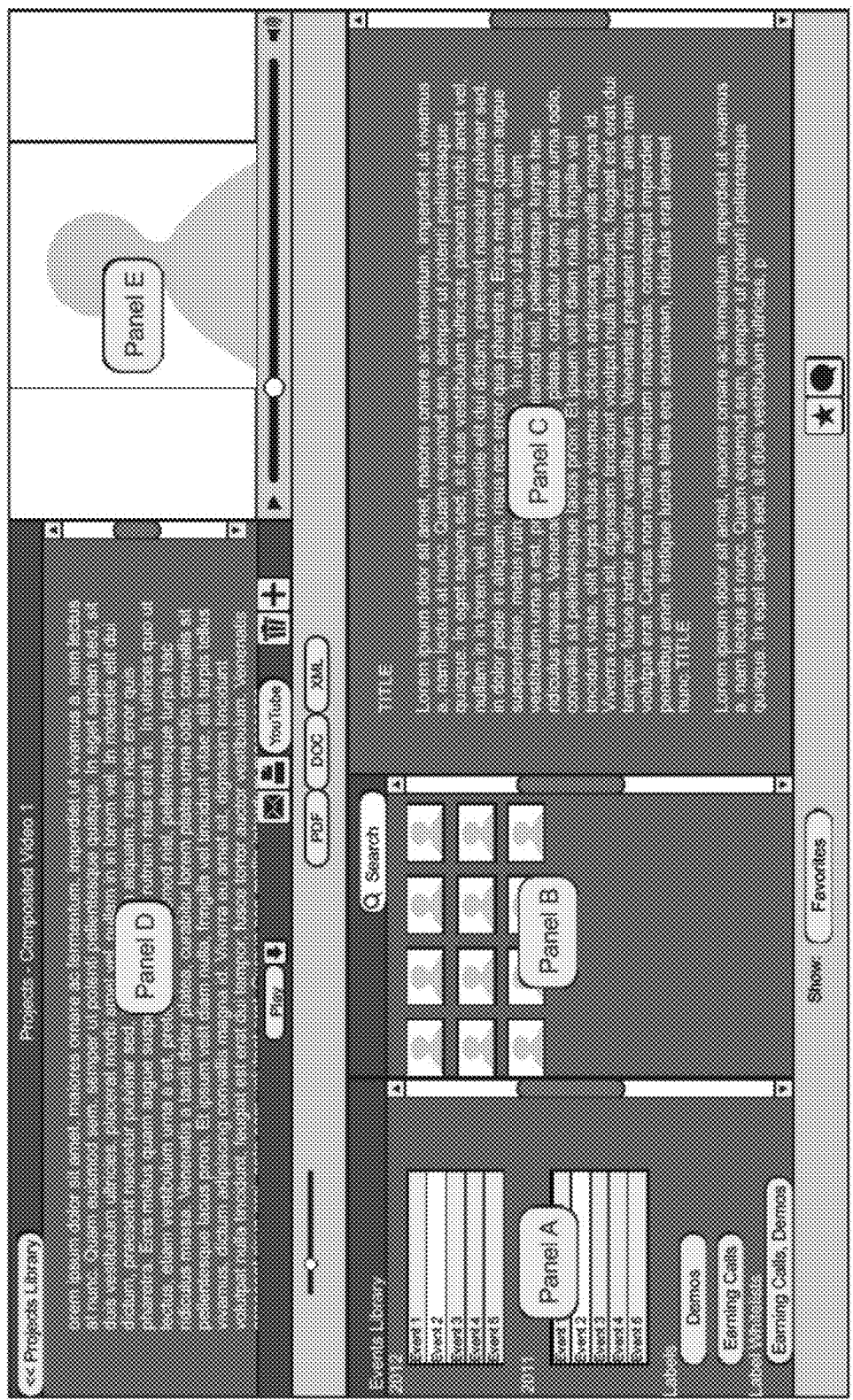
FIG. 11 provides a diagram of the overall user interface of the media editing workspace application, including all workspace panels, according to an embodiment of the invention.

The user opens a project 700 by selecting a project from the list 606. This brings up the web page illustrated in FIG. 11 where, on one portion of the screen, one can view a recording 610 and, on another portion of the screen, there is a corresponding written transcript 608. This web page may also be referred to as the main or client page. Additionally, the project's tagg table 612 is displayed as illustrated in FIG. 11, Labels and Label Whitelists in Panel A. A "label" is a name given to the tagg object that defines start and end time. Whenever a media editor selects a project different from the current one being displayed, the web page replaces Project List 606; Transcript 608; Video 610; and Tagg table 612 with elements of the new project without the browser being reloaded.

An embodiment enables the linking and coordination of the viewable recording, the written transcript, and the various associated taggs. Each point in the recording corresponds to a specific place in the written transcript; if taggs have been created they are linked to specific places in both the video and the written transcript. The media editor, then, has three options for navigating the material: selecting a word in the transcript automatically locates the corresponding spot in the recording; advancing a recording to a particular point automatically locates and displays the corresponding spot in the transcript; and selecting a tag will bring the user to the corresponding places in the video and transcript, and displays the contents of the tag in a dialogue box. The relevant description for FIGS. 7-10 is incorporated herein from U.S. Pat. No. 9,141,938 (entitled "Navigating a Synchronized Transcript of Spoken Source Material from a Viewer Window") and U.S. Pat. No. 8,306,816 (entitled "Rapid Transcription by Dispersing Segments of Source Material to a Plurality of Transcribing Stations") by reference thereto.

Transcript Interactions

The transcripts prepared as described above may be imported into a media editing tool referred to herein as the media editing workspace. The links between a transcript and its associated audio/video clip allow an editor to edit the associated clip by performing word processing on the transcript. Similar to authoring a text document containing paragraphs from other documents, an amalgamated video may be constructed by combining and merging transcripts associated with multiple audio/video clips.

The audio/video editing application may be accessed by many different platforms, for example, mobile, web, desktop, or embedded platforms, allowing users to navigate through digital audio/video content of all file formats via their corresponding transcripts' text and hence enable the editing, compositing, creating, sharing, and other manipulations of their content. A user of the audio/video editing application is a media editor which is different than the transcription editor described above. Thus, in the context of the audio/video editing application, a user is a person who uses the audio/video editing application to perform a media editing role. The user may be a client or represent a client's interest.

After the project is open, the client may select any text in the transcript. Selecting a point in the transcript automatically locates the corresponding time point in the recording and plays the recording from this spot forward. Embedded in the transcript text are timestamps that indicate certain words of the transcript and the associated location in the recording. To identify the time corresponding to a word located between words associated with embedded timestamps, an interpolation computation accurately determines an associated time within plus or minus 200 milliseconds.

The media editor may also read and edit the written transcript. When the user hovers over the written transcript, the timecode for the corresponding location within the media may be revealed. For example, a transparent "balloon tip" may display the time code in the corresponding recording. Depending on the configuration for the project, time codes may show the elapsed time of the recording, the day and time of the original recording, or the SMPTE (Society of Motion Picture and Television Engineers) time code embedded in the original recording.

In an embodiment, hovering may comprise positioning and pausing the cursor over a marker using a mouse or other pointing device.

Audio/Video Interactions

The user may listen to audio and/or view the video recording using common media playing features (play, stop, skip forwards and backwards, play at various speeds, and so on).

The user can drag the play bar in the media player to a desired position 900. The user then may push a 'Show Text' button next to the media player. The timestamp associated with the desired position of the recording may be used to look up the associated closest matching word (i.e. the word whose associated timestamp is the closest match to the current playtime timestamp 902). The browser may display and highlight the text corresponding to the words spoken in the video 912. Additionally, advancing a recording to a particular point automatically locates and displays the corresponding spot in the transcript.

Using Taggs

As described above, a tagg is a memo of description created by the editor that describes the contents of a portion of the recording. By interacting with the tagg table, the user is able to navigate through the recording, in a similar manner to that enabled by interacting with the transcript. The user may select a tagg 714, in response to which the browser may cause the media player to seek to the tagg's associated media timestamp and to highlight the tagg's corresponding words in the transcript.

A tagg can be created for a portion of the written transcript that the user finds useful or interesting. Any number of taggs may be created by various users in a single project and they can be cross-referenced with multiple recordings and transcripts within a project. Taggs are created by highlighting a desired portion of text (also referred to as a segment). Once the text is highlighted, a dialogue box may appear and the user may assign a name (also referred to as a title) to the portion of the recorded source material to which the tagg applies. Taggs may be of any length. A new tagg may overlap the segment corresponding to an existing tagg.

When a new tagg is defined by the user, the program automatically records details related to the tagg, including the author of the segment, the date and time the segment was created, the original recording that correlates with the segment, and the beginning and ending time codes of the segment.

Once a tagg has been defined, the written transcript may be displayed with visual markers that identify the starting and ending points of the tagg segment. Markers are named based on words within the segment so that the name may provide a hint regarding the subject matter contained in the segment. The opening marker of a segment is displayed in colored text, green for example; the closing marker is displayed in a color distinct from that of the opening marker, red for example.

Immediately upon defining a tagg, clients are prompted to write a comment. The client may write a comment of any length relating to a given tagg. Additionally, a user may add a comment to a previously created tagg. Users can also record comments about taggs in response to other clients' previously written remarks. This may serve as a forum for discussing materials.

When hovering over the beginning or ending markers, comments and identifying information may be displayed.

All comments relating to any recording in a given project, along with their identifying details as described above, are stored in the tagg table 612. The tagg table may be viewed and edited online, or downloaded for use in spreadsheet applications. Additionally, the tagg table, or any portion thereof, is separately exportable. In one embodiment, at least the export version of the tagg table is written in a standardized markup language such as XML (eXtendible Markup Language) so that the tagg table may be compatible with video editing programs such as FINAL CUT PRO (APPLE, INC.) or AVID (AVID TECHNOLOGY, INC. Tewkesbury, Mass.). In this way, taggs can be used to facilitate the processes of video logging and editing.

The table may be sorted according to various criteria. For example, an editor may wish to view all of the material related to a particular speaker, and next to see which videotapes this material is on. As such, this is a valuable tool for editing, as it allows people to organize material from various sources.

Taggs may be edited, removed from the table perhaps to be used later, or permanently deleted.

An editor may place (or remove) a star next to one or more favorite segments to assist in editing. Segments may be sorted by the criterion of stars.

Labels and Whitelists

Figure 20:
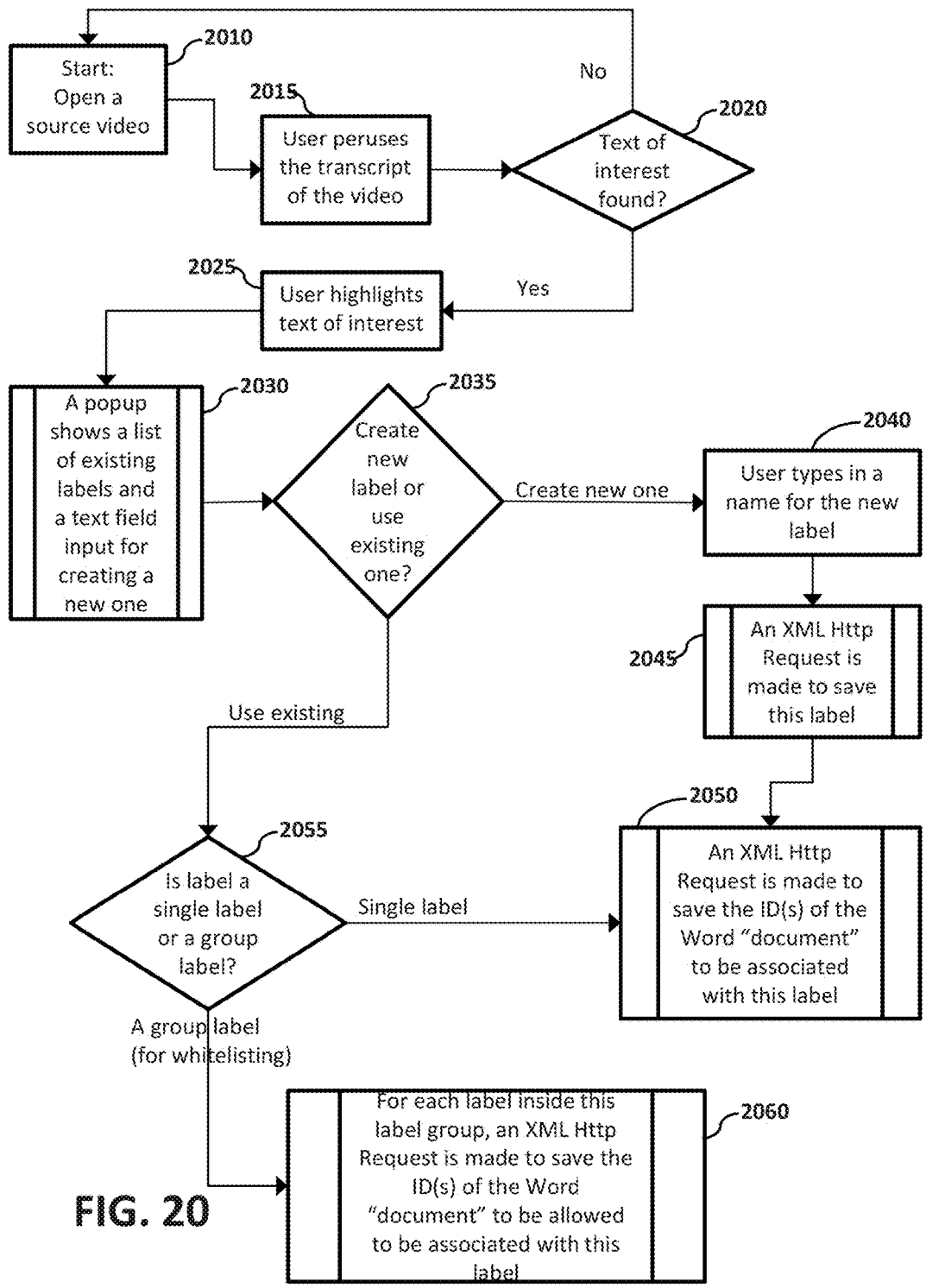
FIG. 20 provides a flow diagram showing the steps for creating labels and whitelists, according to an embodiment of the invention.

FIG. 20 provides a flow diagram showing the steps for creating labels and whitelists, according to an embodiment of the invention. In Step 2010, the editor finds and opens a source recording and associated transcript.

In step 2015, the editor looks through the transcript looking for text of particular interest. If the editor does not find text of interest, the editor may return to Step 2010 to look in a different transcript or stop the search.

In Step 2020, text of interest is found. In Step 2025, a tagg is created to represent the text of interest by highlighting the text of interest in the transcript on the display using a mouse, a keyboard, or other user input device. The editor may select the highlighted text, and in Step 2030, a list of existing labels and a text field input may appear for creating a new label.

In Step 2035, the user selects one or more labels to assign to the newly created tagg and may select an existing label or creates a new label. If the user decides to choose an existing label to apply to the highlighted text, they can choose a label from a label whitelist (a collection of labels) or they can choose a standalone label (a singleton, one that is not currently a member of a label whitelist). In either case, the selected label is associated with the tagg representing the highlighted text and corresponding video.

If an existing single label is selected, as determined in Step 2055, then the label may become associated with the transcript identifier of the current transcript. A transcript identifier identifies an entire transcript. Thus, search for a label may result in a list of transcript identifiers each representing a transcript that has at least a portion associated with the searched for label.

If an existing group label is selected, as determined in Step 2055, then in Step 2060, the transcript identifier may be added to the list of associated transcript identifiers for each label in the group of labels.

If in Step 2035, the user chooses to create a new label, then in Step 2040, the editor enters a label name for the new label into the text field. In Step 2045, the label is created and saved.

In Step 2050, the transcript identifier may be associated with the new label name.

In an embodiment, human editors may review the content of video clips and label portions of the corresponding transcript according to predefined and/or user-established labels.

In an embodiment, the process of assigning labels to video clips by the editor can be performed by a service provider, the client, or another person/organization hired to perform the task.

In an embodiment, the client can create label whitelists. In addition, a service provider may provide consulting services to create the labels and label whitelists for the client.

In an embodiment, a label whitelist may be saved for private use, such that only the creator/owner of the label whitelist may use it, or it can be made available for public use, such that others in the organization can use it and edit it. In an embodiment, a label whitelist may be assigned one of multiple permission settings such as private, use-only, or edit.

In an embodiment, a newly created label may be added to one or more label whitelists or it may be left ungrouped, i.e. a label need not belong to any label whitelist.

In an embodiment, once a label or label whitelist is created, the label may be edited, and existing labels may be renamed or deleted if they have not yet been applied to a project. If a label has already been applied to a project, then it can be set to "hidden" so that it can no longer be applied on future projects.

In an embodiment, additional labels can be added to and removed from an existing label whitelist at any time. Label whitelists may also be renamed, and they may also be deleted. Deleting a label whitelist does not delete the labels contained therein, instead the named grouping of those labels is simply deleted, while the individual labels included in the deleted label whitelist may continue to exist independently, as well as remain a part of any other label whitelists with which they were previously associated.

In an embodiment, labels may be copied and/or moved in and out of label whitelists one at a time or en masse by selecting several labels at one time. Labels may be copied and/or moved between label whitelists in this manner as well.

The user can choose to use some, all, or none of the available label whitelists. Other labels can be added by the user at any time to an existing label whitelist or saved as a new label whitelist for use on current and future projects. Additionally, an editor may apply the labels from multiple label whitelists to a single project. Furthermore, labels from multiple label whitelists can be combined for use as the pool of available filter criteria in a single search.

Labels and label whitelists may be exported using a file format easily readable by common spreadsheet and word processing programs. In this way the user can review and compare outside of the application the labels contained across multiple label whitelists. For example, the user may compare several label whitelists to see which labels are common to all the lists.

Projects, Projects Sections, and Project Pieces

Each project contains project pieces (portions of audio clips, video clips, and corresponding transcripts from any number of events). Project pieces can be organized into groups (project sections) by the user where each project section is given a name. Upon selecting a previously saved project, all previously saved project pieces are loaded in the same state as when the user last visited the project. An autosave indicator may save the work contained in the panel whenever it detects a change. Deleting a project does not delete the source media/transcripts from which the project pieces were derived.

When a project section is first created, it is given a default name, section 1, section 2, etc., which may then be renamed by the user. Project pieces may be assigned to specific project sections by selecting several contiguous project pieces and labeling them as a project section. For example, the user may define the following three project sections in a particular project: Introduction, Body, and Conclusion, where each of these project sections consists of several project pieces of media from different audio/video sources arranged in a specific order.

Each project section may be assigned a section status as to its state of completion. Section statuses may include: "draft," "needs review," "awaiting client approval," "Tigerfish pick," and "final." Each time a section status is applied to a project section, a record of that section status is stored together with the name of the person who assigned the section status along with the date and time it was assigned. When the section status, "final," is assigned, the icon is a lock which then needs to be unlocked in order to make changes to that project section. Anyone can lock and unlock a project section. Each time a project section is set to "final" status, the state of that project section may be preserved in an archive so that the project section may be retrieved in the future exactly as it was when it was locked. Each project section may be locked and unlocked so that the sequence of the project pieces cannot be changed. Also, any transcript portions contained within a locked project section may not have their transcript to media fine-tuning changed, even in the source media, unless the project section is unlocked.

Each project can be expanded or collapsed to show its contents. Three levels for viewing are available: project>project section (optional)>project pieces.

Deleting a project section does not delete the project pieces contained within that unit, it simply removes the grouping of the clips making them independent again.

Similar to project sections, each project may be assigned a project status as to its state of completion. Project statuses and the functionality supporting them are the same as for section statuses.

When printing projects, the user may select options that determine whether comments, notes, and labels are to be printed. Similarly, when emailing a project, the emailed transcript may optionally include associated comments, notes, and labels as well as a link to the corresponding audio or video.

User Interface

FIG. 11 provides a diagram of the overall user interface of the media editing workspace application, including all workspace panels, according to an embodiment of the invention. Panels A & B display the events library where the user can view and manage all their events, with panel B being a dual purpose panel described in more detail below. Event transcripts may be viewed and processed using panel C. Panel D is another dual-purpose panel that allows a user to view and manage projects in the project library and view and process project transcripts. Panel E displays the video viewer where video corresponding to an event video clip or a project video clip may be viewed and processed.

Figure 12:
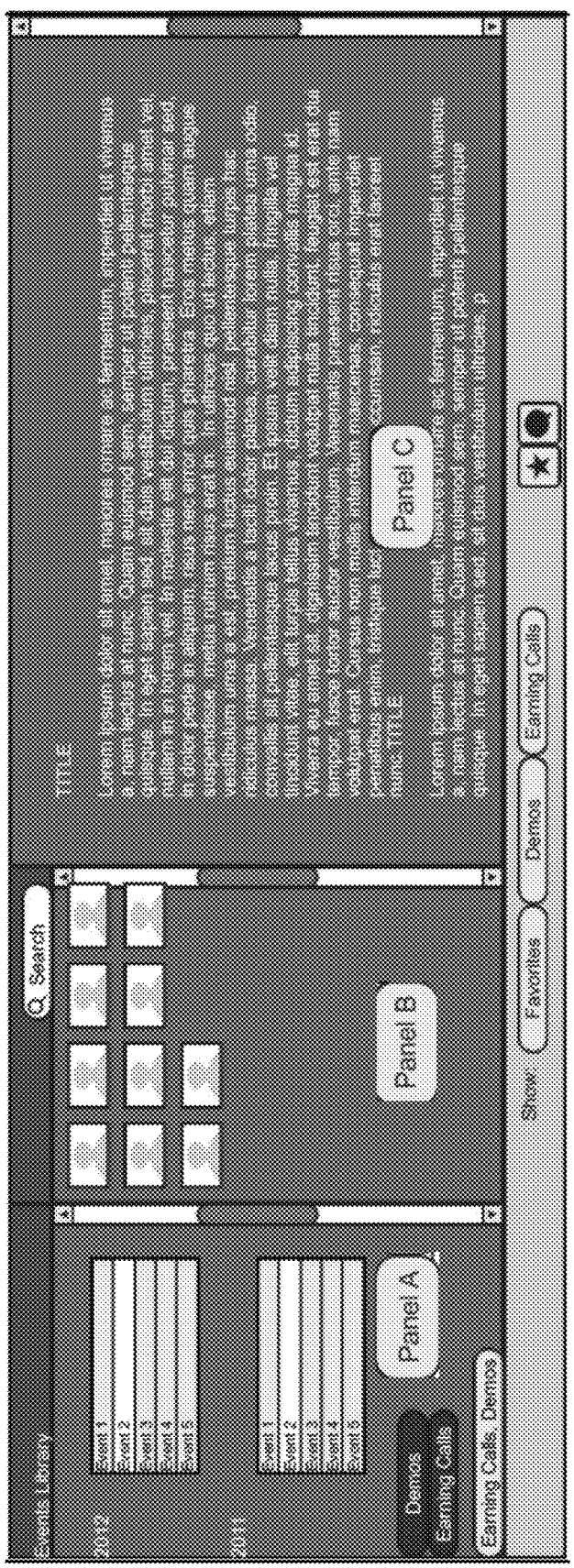
FIG. 12 provides a diagram of workspace panels A & B: Events Library, according to an embodiment of the invention.

FIG. 12 provides a diagram of workspace panels A & B: Events Library, according to an embodiment of the invention. These two panels allow the user to view and manage their events, search and filter video clips across multiple events, see the search results, and save search criteria for future use on other projects. Here the user can also create and manage their labels and label whitelists. Table 1 contains a detailed list of tasks that may be performed using panels A and B.

A user may make a copy of a video and its associated transcript and assign the new copy a new name. The two copies may be edited in different ways. Performing a task on one copy, such as assigning a label may not affect the other copy. This is useful because the same event may be used by different projects having different needs.

The user can search for video clips based on any combination of text, project name, labels, recommended clips, dates, and other factors. The user may search for video clips based on a single criterion or search for clips meeting a combination of criteria by selecting radio buttons for exclusionary selection, checkboxes for multi-select inclusionary selection, applying value sliders, and entering text into text fields. The user may also use one or more label whitelists as the pool of available filter criteria in a single search. There is also an option regarding what parts of the event(s) should be included in the search. The user can include any combination of the following content areas to search: transcripts/videos, comments, labels, transcriber recommended clips, and the user's own recommended clips.

TABLE 1

Tasks performed in panels A and B

View existing events
Change order of event listing by sorting based on a variety of factors
Rename or delete existing events
Edit and save events
View the contents of an event, i.e. see the individual audio/video clips contained in the event
Select an audio/video clip to view its corresponding transcript
Move an audio/video clip from one event to another event
Make a copy of a video and its corresponding transcript
Create and manage labels and label whitelists
Search for video clips/transcripts based on a variety of criteria
Select more than one event to search
Export labels and label whitelists The user has the ability to save and name these searches and retrieve them for future use. Saved searches can be private or made public for others in their organization to use.

The filtered search results from panel A appear in panel B. The resulting videos/transcripts are displayed using a thumbnail version of the corresponding video or audio as an icon. The icon used to indicate a video file may differ visually from the icon used to indicate an audio file. Resulting thumbnails are grouped and organized by default according to event names. The search results may also be grouped and/or sorted using a variety of factors, for example by purchase order number, case name, name of the person who placed the order, media file duration, and more. To select a video or an audio file, the user may select its representative thumbnail displayed in panel B. One or several thumbnails can be selected at a time. Selected thumbnails can be assigned labels via a button that accesses the labeling functionality. If more than one thumbnail is selected, all selected thumbnails may be assigned the chosen label(s) at the same time.

Figure 13:
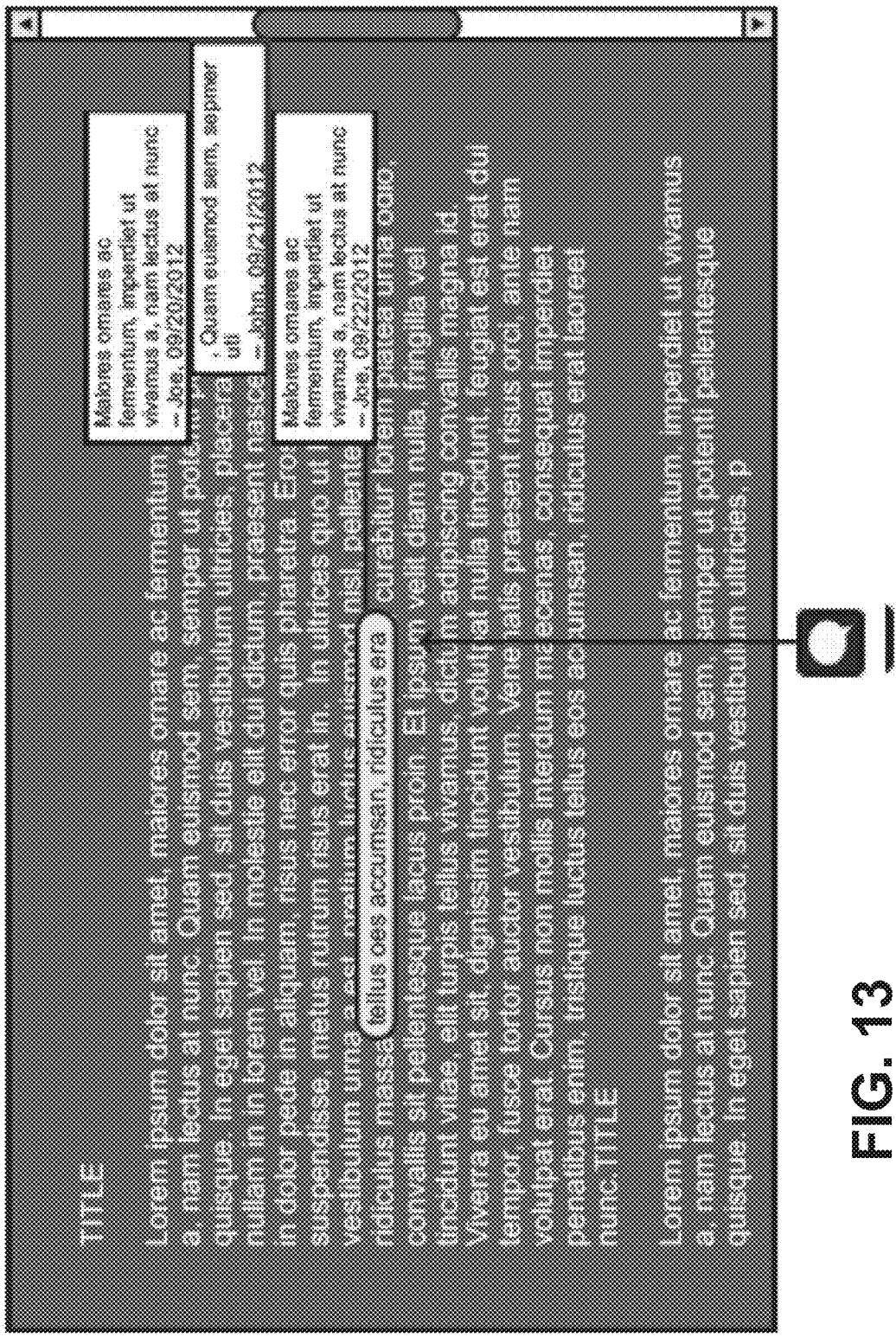
FIG. 13 provides a diagram of workspace panel C: Event Transcripts, according to an embodiment of the invention.

FIG. 13 provides a diagram of workspace panel C: Event transcripts, according to an embodiment of the invention. Panel C allows the user to view the transcript of the corresponding event piece selected in panel B. In panel C, only one event transcript is displayed at a time. However, the user can quickly cycle through viewing several transcripts by selecting them one at a time in panel B. Table 2 lists the tasks that can be performed on a transcript currently displayed in panel C:

TABLE 2

Tasks performed in panel C

View a transcript associated with a selected project
Edit a transcript
Apply a label to the entire transcript
Apply labels to a selected portion of text
Add a transcript note as part of a transcript notes thread associated with the entire transcript
Create and add to comment threads associated with a specific portion of text
Identify recommended clips
Fine-tune the link between the transcript and video clip The user may apply a label to the entire transcript by first selecting the entire text of the transcript. A label that spans transcripts of multiple project pieces may be stored in the database associated with each corresponding transcript section.

A clip can be identified as a recommended clip by selecting a portion of a video by selecting the corresponding portion of the transcript and labeling it as a Recommended Clip. This is used, for example, when the goal is video production and for the purposes of selecting the best video clip of a given speaker. Human editors may also pre-select their favorite video segments. You can add a comment to the Recommended Clip indicating why it was selected.

Each unique comment within a comment thread is identified with the comment date and time, and name of the commenter. Similarly, all transcript notes are identified with the note date and time, and name of the person who wrote the note.

Figure 14:
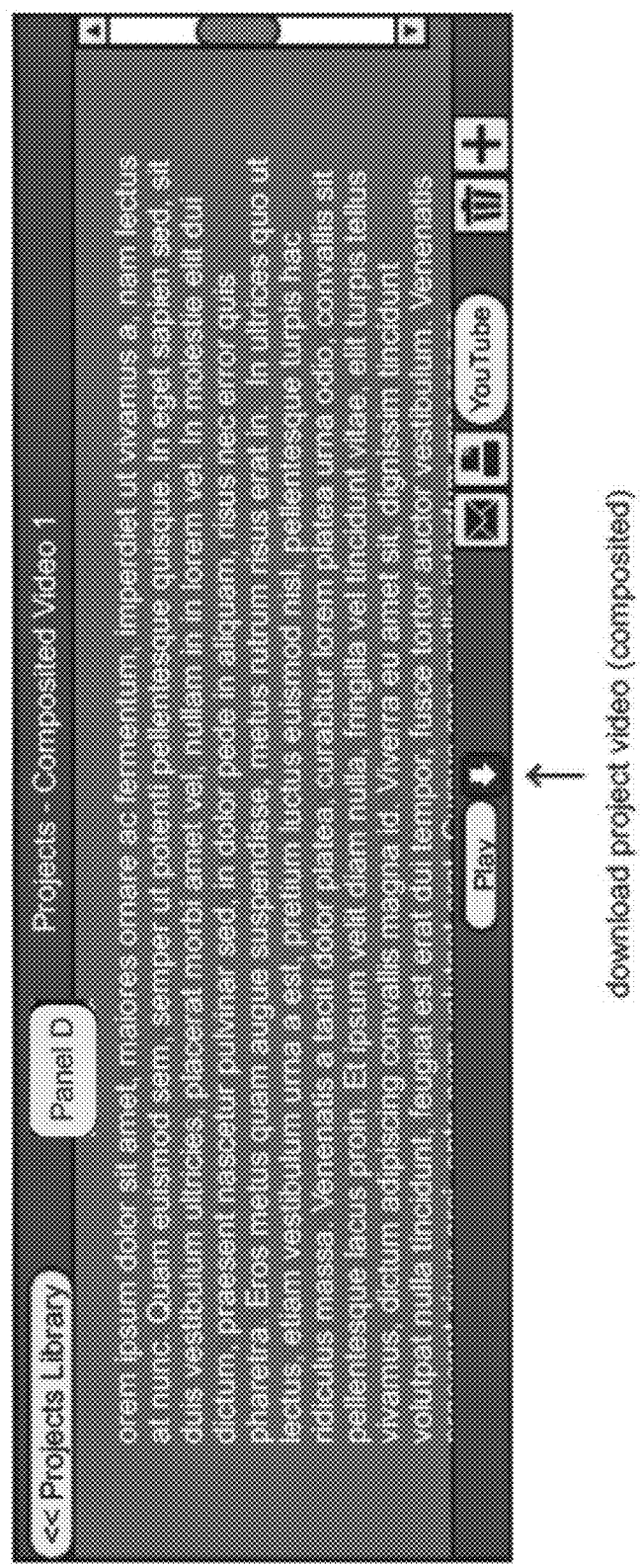
FIG. 14 provides a diagram of workspace panel D: Project Library/Project Transcripts, according to an embodiment of the invention.

FIG. 14 provides a diagram of workspace panel D: project library/project transcripts, according to an embodiment of the invention. This dual purpose panel allows the user to view and manage their projects. It is also one of two panels used to view and manipulate transcripts. Table 3 lists the tasks that can be performed on a transcript.

An amalgamated video may be created using panel D. Video clips are selected by selecting a portion of the associated transcript using the mouse or keyboard, and dragging the selected portion into panel D for compositing. Alternatively the user may use standard Copy and Paste functionality to achieve the same result. In this manner the user may create an amalgamation of video clips in panel D comprised of clips from a number of event transcripts taken from panel C.

In addition to the tasks shown in Table 2, portions of transcripts can be dragged from panel C onto panel D for composing video and transcripts from multiple videos and/or events. Furthermore, the user can choose to swap panel C and panel D thereby changing where the corresponding functionality occurs on their screen.

Portions of event transcripts in panel D become project pieces in the current project which can then be rearranged and/or added to project sections as needed within the project. In so doing, the user can rearrange the transcript pieces to create a specifically ordered amalgamation of video clips.

TABLE 3

Tasks performed in panel D.

Arrange the order of transcript text taken from panel C
Group transcript pieces into collections
Manipulate and process transcripts described in panel C
Add instructive and/or narrative text for video compositing
Drag portions of event transcripts from panel C into the TABLE 3-continued Tasks performed in panel D.

current project
Mouse over transcript text to identify the original video
Add text for video compositing
Trigger the playing of the amalgamated video in panel E
Add a project note as a part of a project notes thread The user may display the source materials used within a composited video and its corresponding transcript by hovering over any transcript text. Doing so may identify the original video corresponding to any transcript text, including video title, date, speaker name and other available information.

The user may add instructive and/or narrative text for video compositing. The specified text may be intended to assist an editor in creating a final video, for example, "insert soft music where the child is speaking" or the text may appear on screen for the purposes of narration, subtitling, or closed captioning. The text may appear next to the video, as well as be included when exporting the project video. Text entered in this manner may appear different from transcript-derived text.

Clicking the "Play" button may result in playing an amalgamated video including all the project pieces, along with any user-entered instructional and/or narration/subtitle/closed captioning text, being played.

A project note may be added as part of a project notes thread associated with the entire project. Such notes facilitate discussion among one or more participants about a given project. The notes may include qualitative analyses, legal, or strategic notes. All project notes are identified with the project note date and time, and name of the person who writes the note.

Any processing and editing of a transcript in either panel C or panel D will be reflected globally for that video/transcript piece throughout the application.

For viewing and managing projects, the user may perform the actions in Table 4. A new project can be created and saved with a unique name even if it does not yet contain any project pieces. This allows the user to set up and organize project names ahead of time and then fill them with the appropriate project pieces at a later time.

The system allows offline editing for panel C and panel D. When the user logs back in after performing any offline edits, those changes are automatically incorporated into the online version of the project.

A project may be exported/downloaded/uploaded to one of several different file formats. Examples of file formats supported may include those supported by professional video editing programs such as Final Cut Pro and Avid, Adobe PDF, XML, popular word processing file formats, and/or exporting as a viewable video file, or uploaded directly to YouTube. The user will be allowed to select whether or not the downloaded transcript contains text-based timecode markers. The user may give the exported file a custom name.

TABLE 4

Tasks performed in panel D

Figure 15:
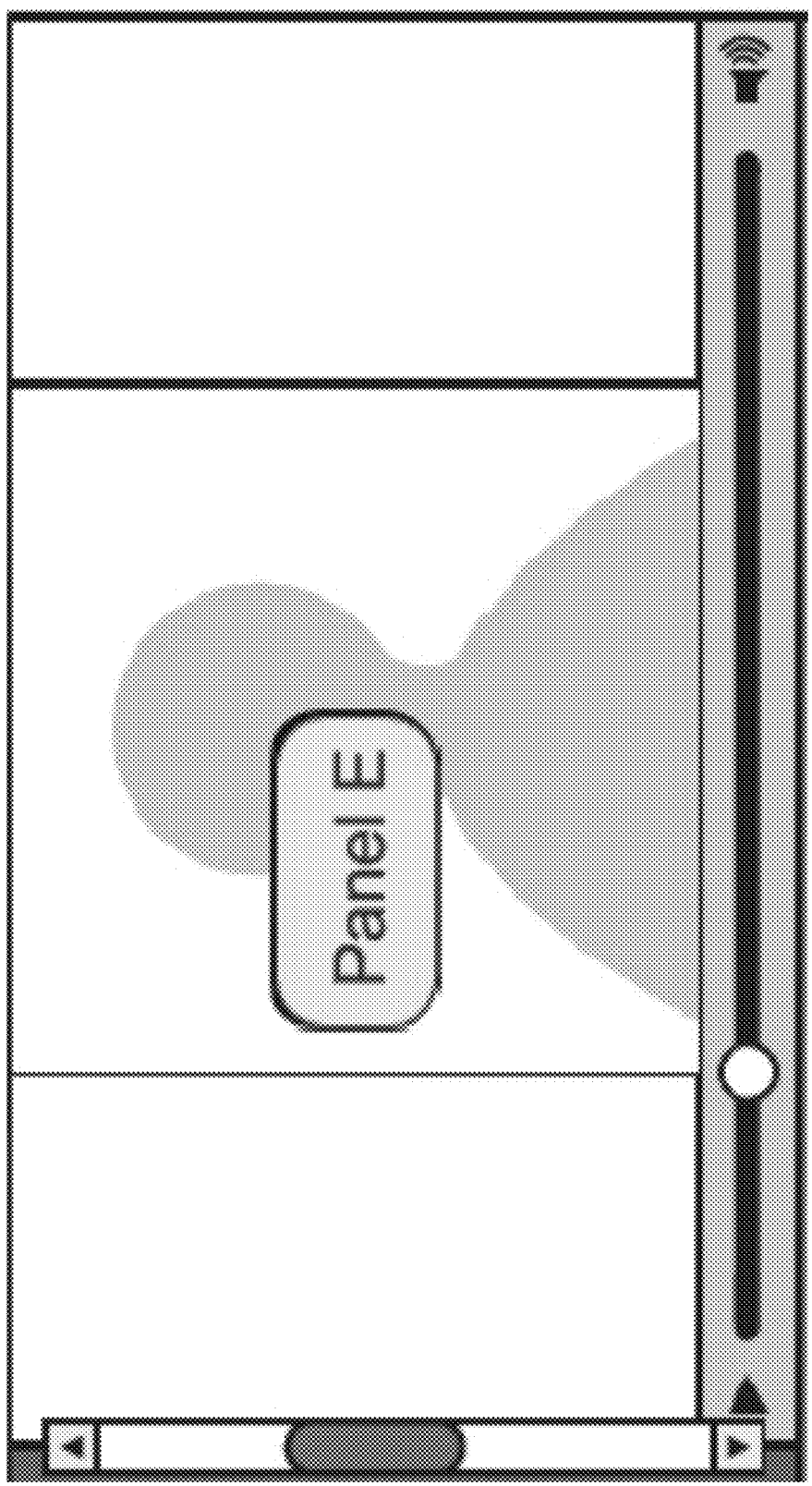
FIG. 15 provides a diagram of workspace panel E: View Video, according to an embodiment of the invention.

Create a new project
View existing projects and select one
Rename or delete existing projects
Edit and save projects TABLE 4-continued Tasks performed in panel D Create project sections
Assign project pieces to a project section
Rearrange project pieces and project sections in a designated order
Name a new project section and rename or delete existing project sections
View and change the status of each project section
View the contents of a project via a hierarchical tree structure
Apply a single label that spans the transcripts of several project pieces
Save the project
View and change the status of a project
Use the project library tree structure to copy and/or move project pieces and/or project sections between projects
Export projects to one of several file formats
Print projects FIG. 15 provides a diagram of workspace panel E: View Video, according to an embodiment of the invention. Panel E allows the user to view video that corresponds to the selected transcript(s). The panel may display the video that corresponds to a single event transcript, or portion of that event transcript, contained in panel C. The panel may also display the video of the amalgamated project from panel D, together with optional corresponding text used to instruct the final video editor and/or used for narration, subtitling, or closed captioning of a final video.

Panels can be slid into view, be hidden from view, and expanded/collapsed in size so that the user can work with combinations of panels to best meet the needs of the tasks they are performing. As described above, FIG. 11 shows all five panels displayed together.

Figure 16:
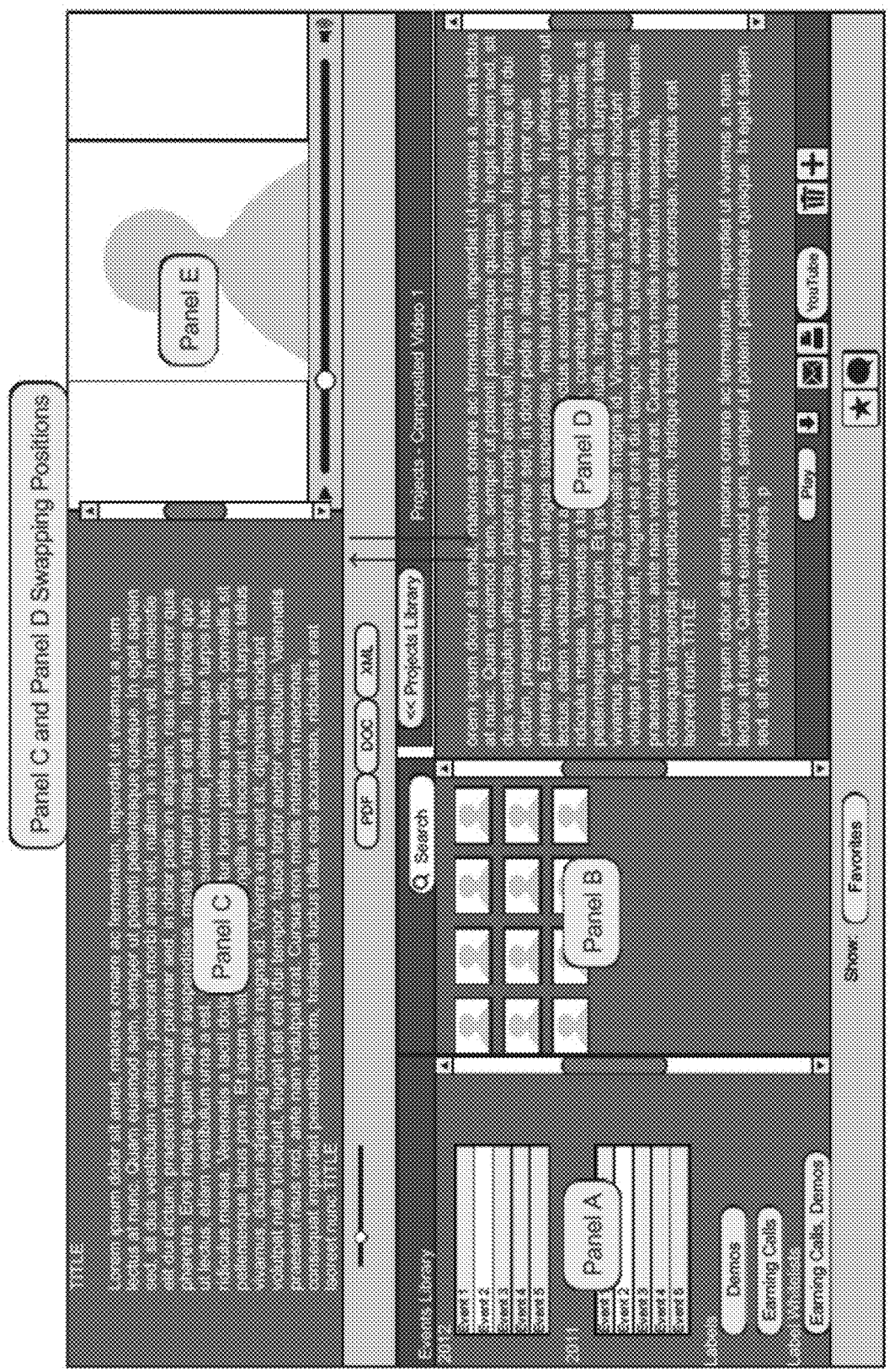
FIG. 16 provides a diagram of the media editing workspace user interface with the positions of panels C and D swapped, according to an embodiment of the invention.

FIG. 16 provides a diagram of the media editing workspace user interface with the positions of panels C and D swapped, according to an embodiment of the invention. All functionality as described above for panel C and panel D remains with those panels, but the placement of these two panels on the screen can be changed by the user to suit their preferred user interface layout.

Figure 17:
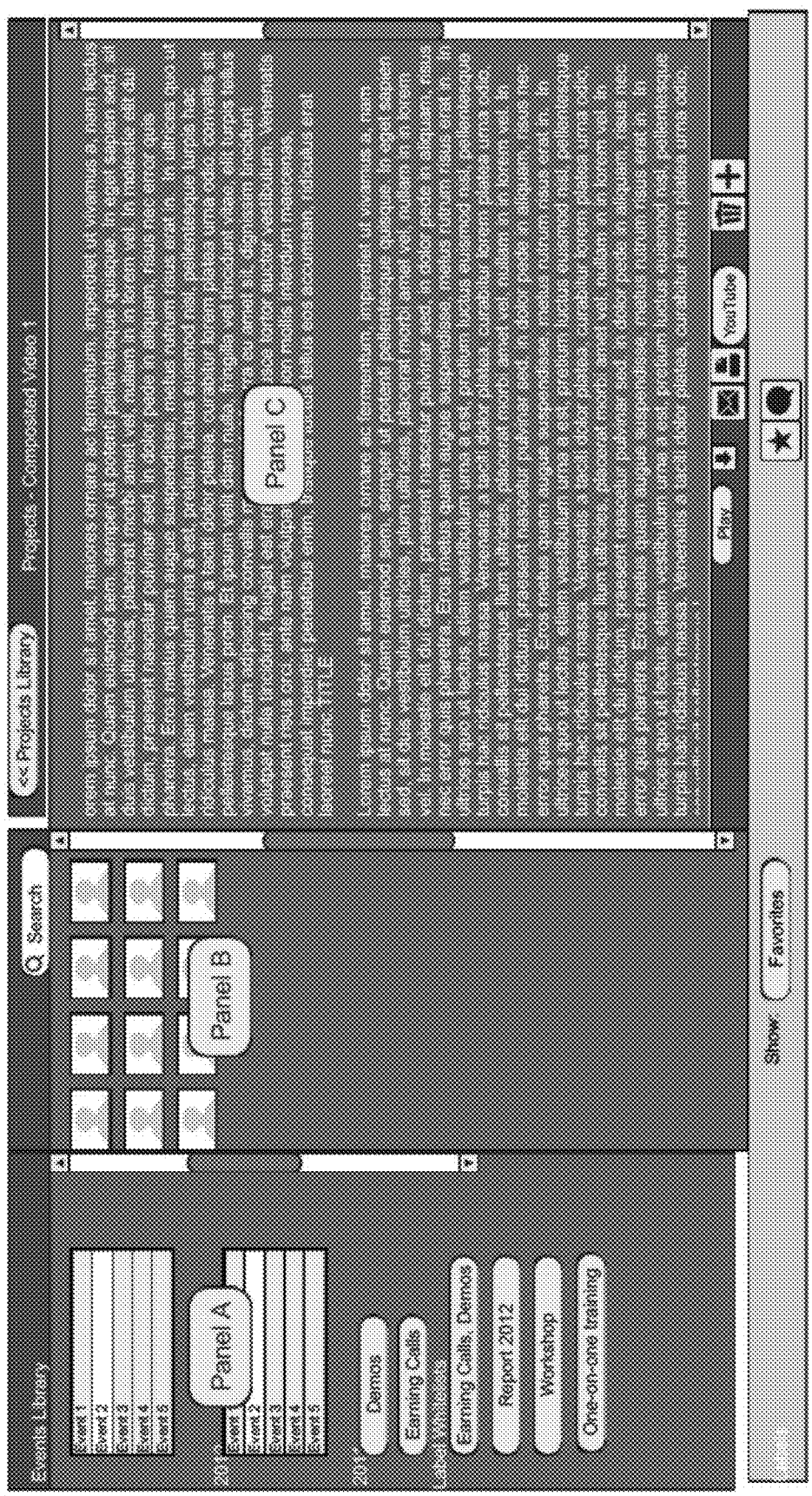
FIG. 17 provides a diagram of the user interface where panels D and E are hidden, according to an embodiment of the invention.

FIG. 17 provides a diagram of the user interface where panels D and E are hidden, according to an embodiment of the invention. When panels D and E are hidden, panels A, B, and C may expand vertically. The user may need to focus only on their source transcripts from their events. Allowing them to hide panels D and E and thereby expand the remaining panels A, B, and C gives them more screen space to work with.

Figure 18:
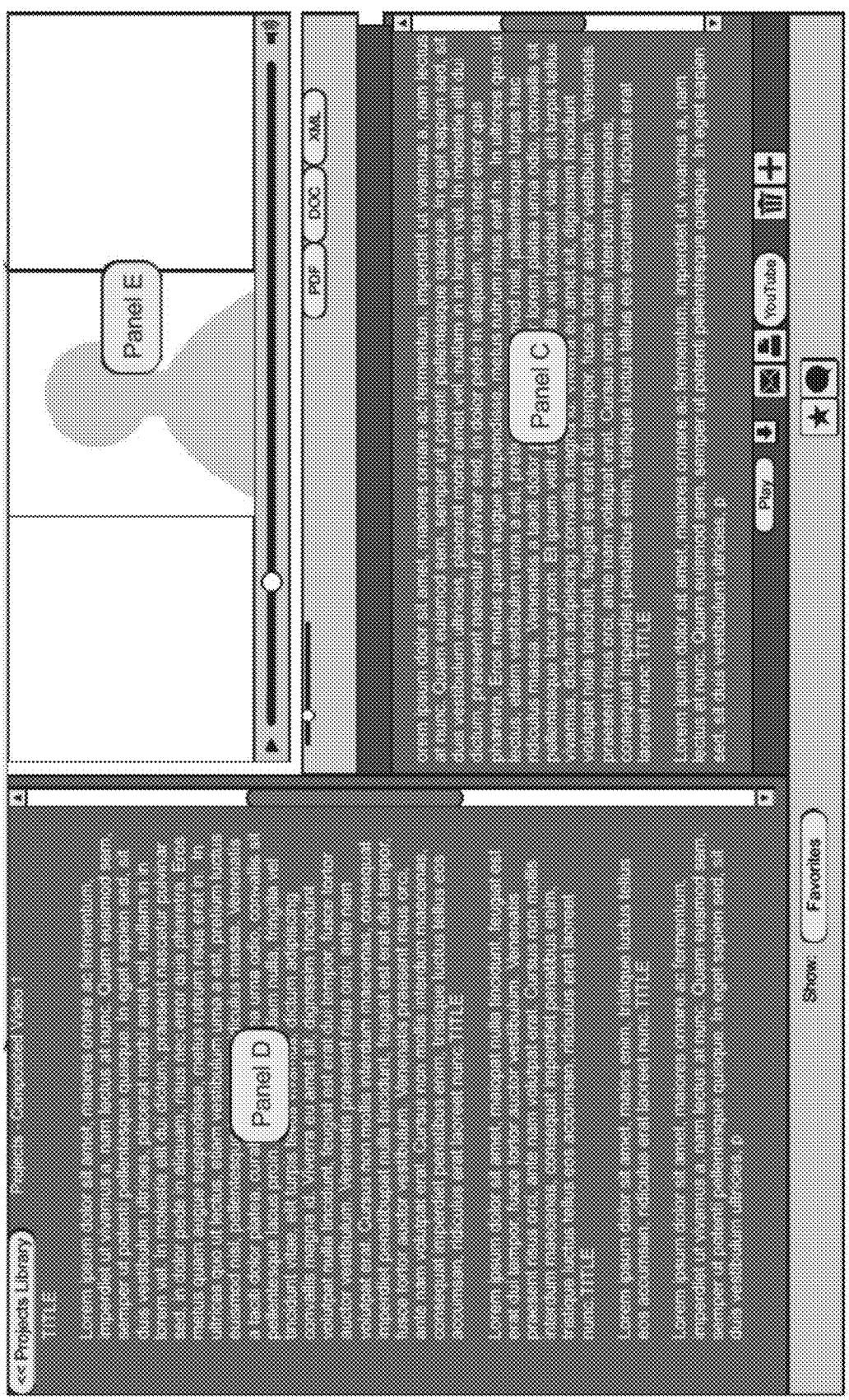
FIG. 18 provides a diagram of the user interface where panels A and B are hidden, according to an embodiment of the invention.

FIG. 18 provides a diagram of the user interface where panels A and B are hidden, according to an embodiment of the invention. When panels A and B are hidden, panel D may expand vertically. The user may need to focus on the transcript text from a source event video, the transcript text that is part of a composited project, and the corresponding video for either transcript. Expanding panel D vertically allows the user to view a piece of source video and decide if and where it should be included in the composited project. By hiding the events library panels A and B, the user may have the most screen real estate available for focusing just on the transcripts and the corresponding videos.

Figure 19:
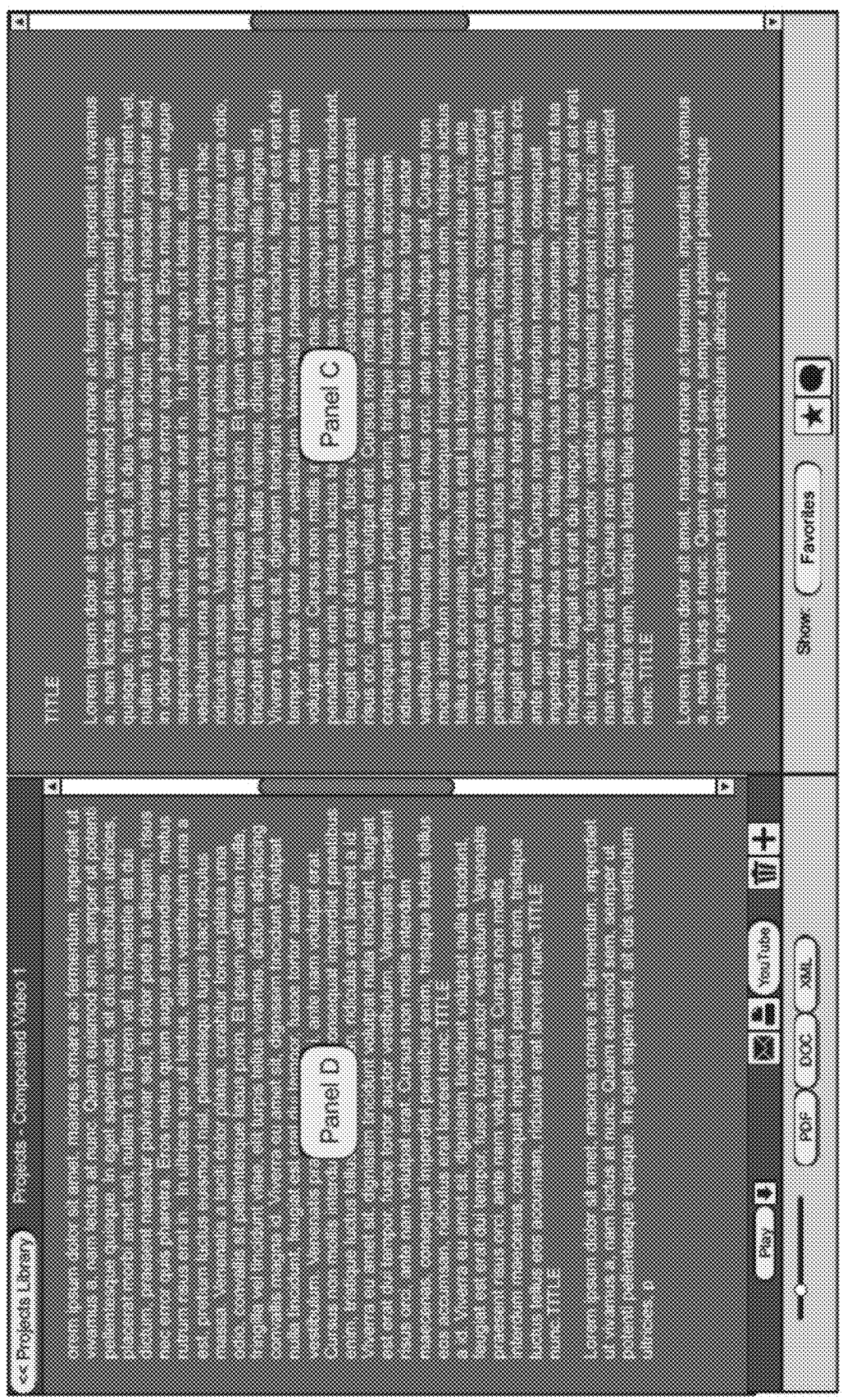
FIG. 19 provides a diagram of the user interface where panels A, B, and E are hidden, according to an embodiment of the invention.

FIG. 19 provides a diagram of the user interface where panels A, B, and E are hidden, according to an embodiment of the invention. By hiding panels A, B, and E, panels C and D may expand vertically and exist side-by-side.

Figure 21:
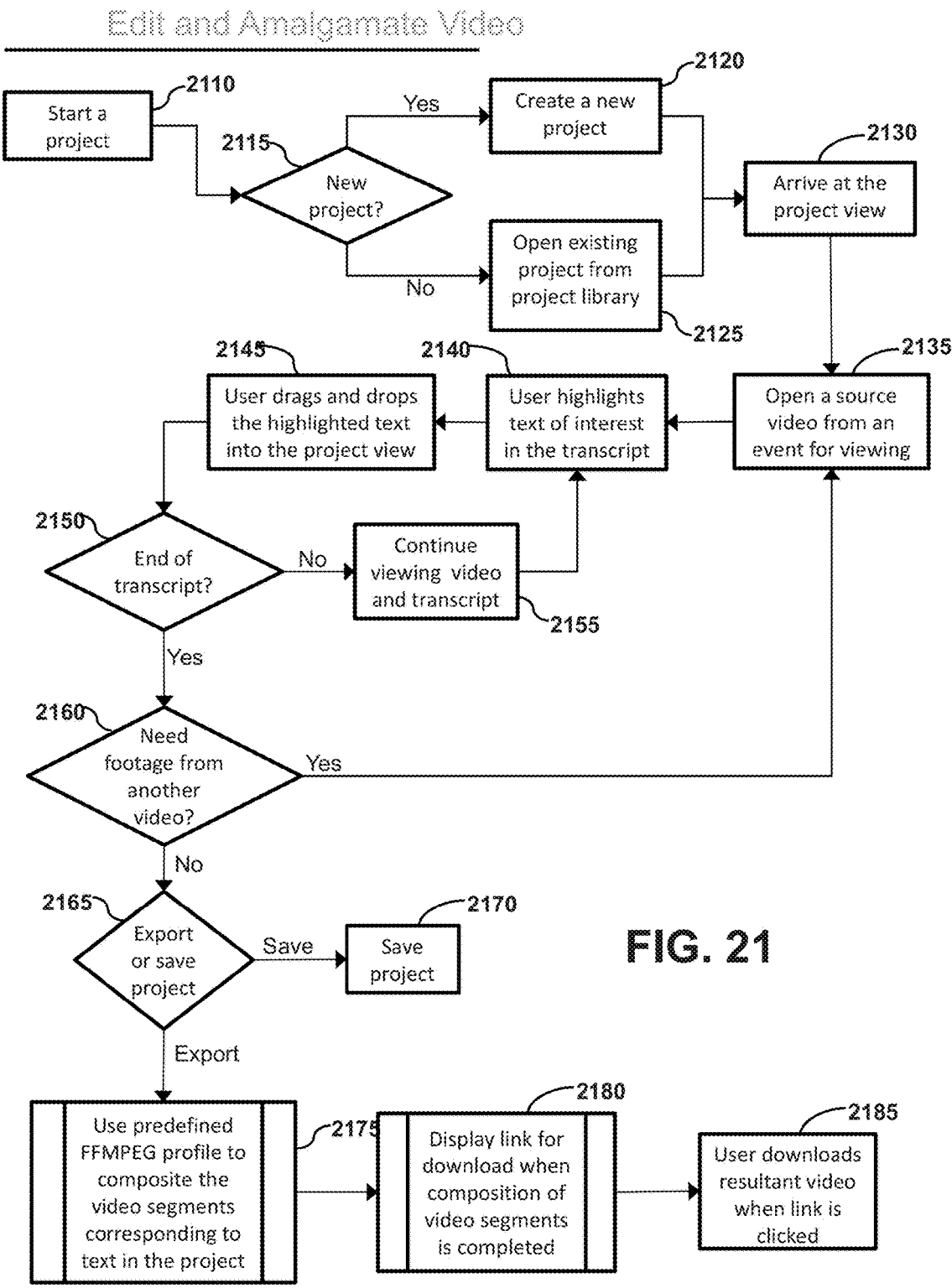
FIG. 21 is a flow diagram of how an editor may create a project, edit and amalgamate video clips and their corresponding transcripts within that project, and may save and export the project, according to an embodiment of the invention.

FIG. 21 is a flow diagram of how an editor may create a project, edit and amalgamate video clips and their corresponding transcripts within that project, and may save and export the project, according to an embodiment of the invention.

In Step 2110 an editor initiates work on a project. In Step 2115, a determination is made regarding whether the editor wants to create a new project or open an existing project. If a new project is to be created, it is created in Step 2120. If an existing project is requested, the project is opened from the project library in Step 2125. In Step 2130, the project is displayed in the user interface with the focus in panel D.

Figure 23:
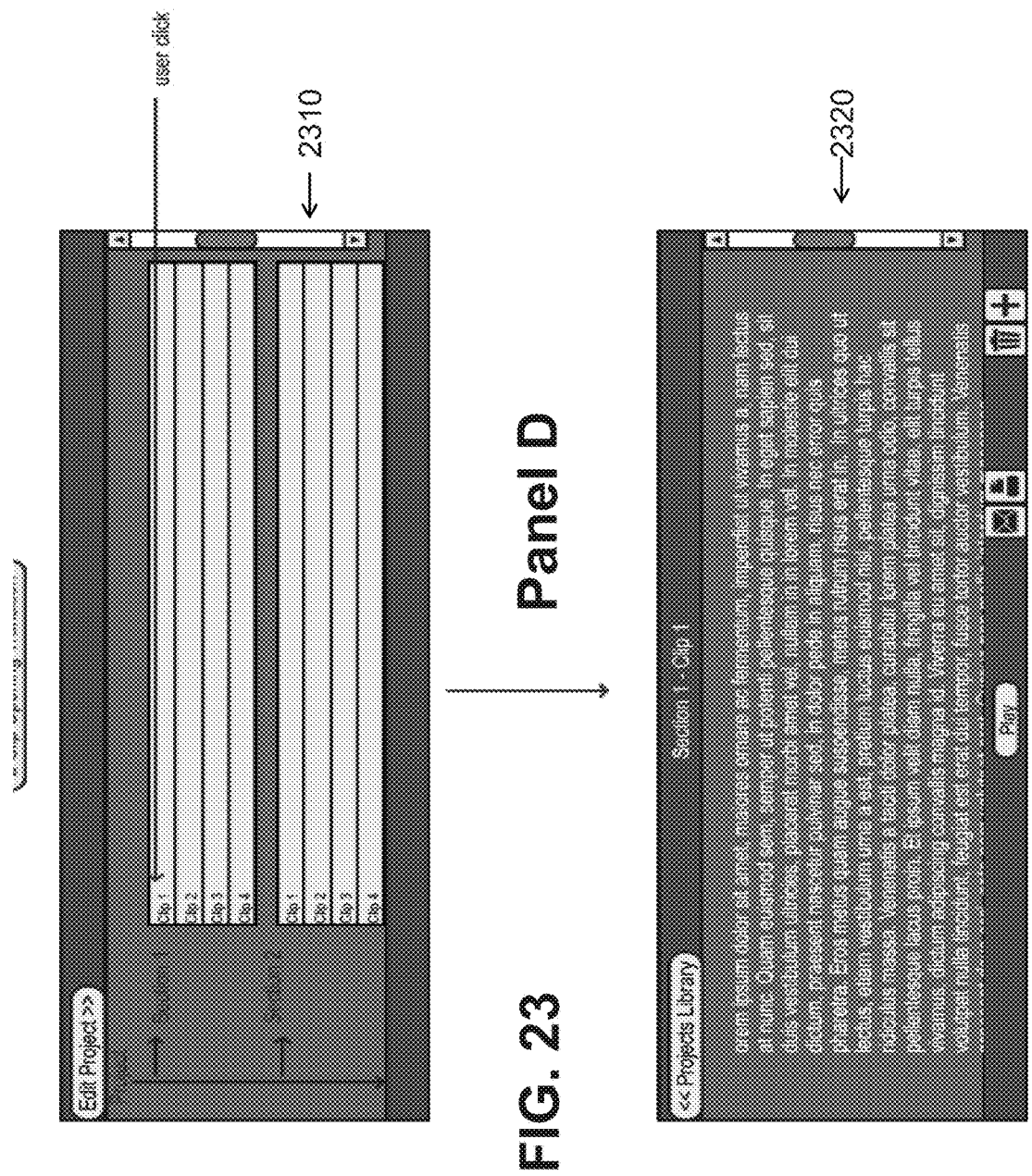
FIG. 23 provides a diagram of two different views of Panel D.

In Step 2135, the editor selects a source event in panels A and B, and opens a corresponding source transcript for viewing in panel C and a corresponding source video is displayed in panel E. In Step 2140, the editor highlights text of interest in the transcript (panel C). Even when the editor needs a composited video as an end result, they may use the video's corresponding synchronized transcript as a means to cut and composite the video. Alternatively, the editor may only need a composited transcript for their end result. Either way, the method for compositing video or compositing transcripts is the same. In Step 2145, the editor may drag the highlighted text from panel C and drops the highlighted text into the project view (panel D). Note that panel D has two views: project library view and project transcripts view. The editor can drag the selected text from panel C onto panel D in whichever view panel D happens to be in. FIG. 23 provides a diagram of two different views of Panel D. When in project library view, the selected text will appear in panel D as a project piece to be arranged within the project as shown in the hierarchical tree view 2310 in FIG. 23. The name of the project is at the top level of the hierarchical tree, then sections within a project are at the next level of the tree, and then individual clips within each section are leaf nodes in the tree. Clicking on a clip within a section of a project causes Panel D to switch to transcript view showing the transcript of the selected clip in the transcript view 2320. If Section 1 is clicked on, the transcript associated with Clips 1 through 4 would be displayed in Panel D transcript view 2320. If the entire Project is clicked on, the transcript associated with all clips currently in the project would be displayed.

In Step 2150, a test is made to determine if the end of the transcript has been reached. If the end of the transcript has not yet been reached, then in Step 2155, the editor may continue viewing video and transcript, returning to Step 2140. If the end of the transcript has been reached, then in Step 2160, the editor may indicate whether footage is needed from another video. If more video is needed, the editor returns to Step 2135 where a new source video may be opened. If no more video is needed, then in Step 2165 the editor may save the project in Step 2170 or export the project in Step 2175. Exporting may use a predefined profile for a programmable media converter such as FFmpeg to composite the video segments corresponding to the text in the project. In Step 2180, when the composition of video segments is completed, a link may be displayed for downloading the composite video. In Step 2185, the editor traverses (e.g. clicks on) the link and downloads the resultant video.

Example Embodiments

The system components illustrated in FIG. 22 may be embodied in a variety of ways. What follows are one or more exemplary implementations for the components.

Hosting Environment

Although the provider of the transcription service and video editing application may provide and manage the hardware environment in-house, at least some pieces of the hardware environment may be hosted by a third party provider. As shown in FIG. 22, in an embodiment, the editing application may be hosted in a hosting environment 2200 that manages the databases and servers. The hosting environment may be an application or service provider's IT datacenter or the hosting environment may be outsourced to a cloud computing provider. The components of the audio/video editing application may be independently hosted by commercial hosting services. For example, third-party hosting services such as Heroku, Rackspace, and Linode may be used separately or all at once to provide stable accessibility to data and scalability of application load. The database may be hosted by third-party services such as MongoLab, MongoHQ, and custom Amazon EC2 for redundancy and fast retrieval. Application versioning may be handled by Github, for example.

The hosting environment 2220 may include an asset database 2202 for storing digitally captured audio and video, a transcripts database 2204 for storing transcription artifacts such as a textual transcript, tags, and project lists, and one or more web servers 2240 for generating web pages 2242, 2244, 2246 that provide the browser-based user interface of the application as well as to upload updated transcription artifacts.

Transcript Database

The integrator and provider of the transcription platform may custom build a database to specifically address the needs of the application. Alternatively, in an exemplary embodiment, an existing document-oriented database system such as MONGODB may be chosen for the database layer due to its inherent extensibility characterized by easily-added functionality and flexibility in changing the schema. For example, the following functionality may be offered: A client collection may store relevant data to provide information for the backend server to identify a valid client; a transcript collection may store metadata of the transcript of a media file, and a word collection may be associated with transcript documents from the transcript collection such that a document from the transcript collection can have many documents from the word collection. In an embodiment, a Word document in the word collection may be stored in WORD (MICROSOFT CORPORATION, Redmond, Wash.) format; however, a document in the Word collection may be stored in other textual formats understood by other word processors. Each Word document will contain exactly one word of the transcript and the timestamp that matches the time in which the utterance thereof takes place in the media file's playback. Other embodiments may provide the documents in one or more additional formats; for example other word-processing formats, or PDF (portable document) or as text files.

The transcript database may further store a client collection having an association with the transcript collection such that a client document can have many transcript documents; a label collection for 'bookmarking' individual or a range of Word documents; an event collection into which transcript documents are organized; and/or a project collection to contain new transcript documents that are created from snippets of existing transcript documents created by the client or a professional transcription service, such as Tigerfish, from their original media files.

Web Framework

A web framework, such as Rails and Node, may be used to provide authentications, Model-Controller-View code organization and abstraction, routing web URL or TCP/IP requests into actions inside a controller and thus triggering retrieval, creation, modification, and destruction of data inside the database collections. For authentication, various open-sourced Ruby Gems (plugins for the Rails web frameworks) or NPM modules (plugins for the Node.js web framework) for this purpose will be used, e.g., 'devise' or 'sorcery'. Assets such as media files, JavaScript, Cascading Stylesheets, and images will be stored on 'cloud storage' such as Amazon S3. They are served from multiple locations to maximize the number of allowed concurrent connections into the browser for optimal transfer rates.

User Interface and Frontend

User interface elements (UI elements) may be provided by open-sourced libraries such as Twitter Bootstrap or jQuery-UI for responsive design allowing the Application to fit in any screen size such as a screen on a desktop computer, laptop computer, tablet computer, and/or mobile phone. A UI element has associated behavior when selected by a user. User interactions may be conveyed and interpreted by CoffeeScript into frontend side controller actions created by the open-sourced project Angular.js, which determines user interactions such as mouse click, mouse hover, keypress down, keypress up, mouse scroll, etc., and when these actions happen upon a designated UI element, an action inside the Angular.js controller may be triggered such as to seek the playback position of a media file, to retrieve transcript data from the backend, to create a new transcript in the backend, etc. Video/audio playback may be natively supported by the browser.

In an embodiment, a Model-View-Controller (MVC) software architecture pattern may be used to implement the media editing application. The view may be implemented by browser elements together with cascading style sheets, HTML templates, and embedded scalable vector graphics, flash, java and/or silverlight.

The model may include the application data stored in the database. The application data comprises the transcript artifacts, the source media, tagg tables, client information, transcripts, and the relationship among these data. The model may include functions for retrieving, updating, and storing the application data. The controller responds to user input by generating commands for the model and/or view. Upon receiving user input, a browser may call a controller 604 such as 'Ruby on Rails.' Depending on the type of user input, the controller may invoke functions to change the model and/or to change the view.

Upon logging in, the controller may collect all the HTML items included in the specification of the view template. Each HTML item is a placeholder for and represents where and how to display text items retrieved from the database. The controller may also retrieve the text items from the database and display the text items as directed in the pre-made view template on the user's browser. The view template specifies which text item goes to which portion of the four portions of the main page 602 mentioned above. Then the main page is loaded.

An important feature of the media editing user interface is the ability to navigate from a time location in a source media to a corresponding word in a textual transcript, from a word in a transcript to a corresponding time location in the source media, and from a tagg to the corresponding locations in both the source media and the transcript.

An HTML element may be created for displaying a selected word in a transcript. The HTML element may be associated with a word document in the collection of word documents comprising the transcript. This HTML element may also contain the HTML5 'data-attribute' for the timestamp for the associated word document. An event-listener for the 'mouse click' event may be set to listen for user clicks upon this HTML element. When clicked, this HTML element may convey the timestamp to the appropriate action inside the Angular.js controller for seeking position in the current video/audio playback in the browser.

The action in the controller may be associated with a Set Time event in a JavaScript library that passes the audio or video identifier and the timestamp to the QUICKTIME player. The QUICKTIME player automatically issues a call back which carries the message indicating whether or not the portion of media has been loaded. When the JavaScript library receives the call back, the library may notify the user through a CSS pop-up that the video is still being downloaded and cannot be played, and when the appropriate portion of the video is loaded, the QUICKTIME player may play the video, beginning at the spot indicated by the time stamp.

When the user repositions the video to a new time location, the QUICKTIME player may invoke a JavaScript function that passes the current playtime timestamp in the QUICKTIME player to a JavaScript library which then converts hours/minutes/seconds timestamp to an integer timestamp and finds the closest matching word ID whose timestamp is the closest match to the current playtime timestamp. This JavaScript function then highlights the text whose timestamp matches the word ID that was just found. The browser displays and highlights the text corresponding to the words spoken at that location in the video.

To create a tagg, the user may highlight a portion of the transcript using an input device such as a mouse, keyboard, gesture-based pointing device, stylus, or voice command. Highlighting the portion of the transcript triggers a pair of JavaScript events. The 'OnMouseDown' event causes a word ID, transcript ID, and a timestamp of the first word highlighted to be passed to a hidden html form. The 'OnMouseUp' event causes a word ID, transcript ID, and a timestamp of the last word highlighted to be passed to the hidden html form, which triggers a third event called' 'FormPopUp'.

The 'FormPopUp' event may utilize the CSS 'visibility' attribute to unhide the hidden form mentioned above, so that the user is now able to enter desired descriptive information in this form. When the user has done so, the user clicks a button which submits the form to a URL which triggers a 'Create Tagg' action in a 'Ruby on Rail's' controller. That action sends the parameters to the tagg model in 'Ruby on Rails', where a validation function is triggered that checks all the incoming data.

If all data is validated, the model creates a new row in a database table (such as the 'MySQL' database). The controller calls a built in 'Prototype' JavaScript event which updates the browser with the new data, without reloading the browser. If not all data is validated, the model calls the controller to send an error message back to the browser, which is displayed by setting the CSS 'visibility' attribute of the error message HTML div tagg to "visible."

The user clicks on a time stamp in the tagg table 612. This may trigger an 'OnClick' JavaScript event that calls the inline html JavaScript function to replace this time stamp with an editable field. This editable field contains four subfields, labeled Hour, Minute, Second, and milliseconds or Frames. The user can then manually input a number in one or more of these subfields. The user either hits "Enter" or "Escape".

Hitting 'Enter' or clicking anywhere on the web page submits these parameters to an action in the controller that passes these parameters to a model which does a validation of this data. If the data is validated, the model updates the entry in the database table. The action also overrides the original time code in tagg and sends these parameters back to another action in the controller which updates the tagg in the tagg table in the browser without reloading the browser.

Hitting 'Escape' triggers an 'onkeypress' JavaScript event which triggers a JavaScript function to cancel and remove the editable mode and hence leave the timestamp unmodified. The JavaScript function also restores the display mode.

Analogous to the traditional "copy and paste" in desktop word processors, a user may drag and drop the above HTML element(s) into an empty HTML element. A transcript is formed when HTML elements are pasted into the previously empty HTML element. The timestamps of the "pasted" HTML element(s) are preserved corresponding to playback points of the video. The user can save this newly created transcript from the originally empty HTML element in the backend database where upon re-login into the App, the user created transcript will be re-displayed.

Creating a Label

Each of the UI elements that correspond to a Word document may also be marked for creating a descriptive label document. To create a label, the user may right click on the UI element, a listener for the right click event may trigger an action in the Angular.js controller which may prompt the user for some descriptive text for the label and save this label automatically to the database. The label thus created can be re-applied to any other word document(s). To do so, the user may mark the word document(s) and right click on it causing the same prompt where the user had previously put in the descriptive text for the label to appear. In the prompt there may be a list of existing labels to choose from, clicking on which will cause the Angular.js controller to form a one-to-many (one label to one-or-many word documents) association and save this association in the database. Additionally, a word document may be assigned multiple labels by repeating the above steps on the UI element that corresponds to the word document using the right click event. Such labels may be queried in the future for filtering transcripts. Such filtering may be performed by the server where a database built-in search mechanism is used to filter out relevant transcript documents. The search which filters the transcript documents in the frontend uses the same search mechanism as used by the server, and at the same time allows the user to designate additional filtering attributes all at once or one at a time, wherein a collection in the database will be instructed to filter forever finer selection.

In the foregoing specification, the invention has been described with reference to specific exemplary embodiments thereof. It will, however, be evident that various modifications and changes may be made thereto without departing from the broader spirit and scope of the invention as set forth in the appended claims.

The specification and drawings are, accordingly, to be regarded in an illustrative sense rather than a restrictive sense.

The invention claimed is:

1. A computer-implemented method for editing video using a corresponding written transcript, the method comprising the steps of:
   displaying one or more events within an events library of a workspace application;
   receiving from a user, via an input device, a selection of a particular event of the one or more events;
   receiving from the user, via the input device, input specifying a label within the events library, wherein the events library enables the user to create and manage labels usable across the workspace application;
   appending the label to an event, a transcript segment, or a video segment that has been selected from the events library by the user;
   retrieving a first video source corresponding to the particular event and a written transcript that is synchronized to said first video source;
   displaying the written transcript in a first user-accessible text viewer of the workspace application;
   receiving from the user, via the input device, a selection of a portion of the written transcript;
   receiving from the user, via the input device, a selection of a location within a second user-accessible text viewer of the workspace application;
   copying the selected portion of the written transcript from the first user-accessible text viewer and pasting the selected portion to the location within the second user-accessible text viewer;
   repeating said copying and pasting process between the first user-accessible text viewer and the second user-accessible text viewer;
   rearranging a plurality of portions in any order within the second user-accessible text viewer based on commands received from the user;
   creating an amalgamated video based on the plurality of portions that appear in the second user-accessible text viewer by combining segments of the first video source corresponding to the plurality of portions;
   playing the amalgamated video in a user-accessible video viewer of the workspace application;
   continuing to refine the amalgamated video responsive to further manipulation of the plurality of portions in the second user-accessible text viewer by the user; and
   globally harmonizing changes made by the user within the first user-accessible text viewer, the second user-accessible text viewer, and the user-accessible video viewer across the entire workspace application.

2. The computer-implemented method of claim 1, the method further comprising:
   displaying a second transcript of a second video source that is different than the first video source;
   allowing the user to copy and paste portions of the second transcript into the second user-accessible text viewer; and
   responsive to the user selecting a textual transcript segment among the plurality of portions pasted into the second user-accessible text viewer, displaying video/transcript details of the selected textual transcript segment.

3. The computer-implemented method of claim 2, wherein the details include event name, recording name, time code, date of recording, time of recording, or a combination thereof.

4. The computer-implemented method of claim 1, further comprising:
   receiving from the user, via the input device, input of one or more parameters within a search field displayed in the events library of the workspace application;
   performing a search or a filter of video clips across all of the one or more events based on the one or more parameters; and
   presenting results of the search or the filter within another events library of the workspace application.

5. A non-transitory computer-readable storage medium storing instructions for editing video using a corresponding written transcript, said instructions, when executed by a processor, causing the processor to:
- display one or more events within an events library of a workspace application;
- receive from a user, via an input device, a selection of a particular event of the one or more events;
- receive from the user, via the input device, input specifying a label within the events library,
  - wherein the events library enables the user to create and manage labels usable across the workspace application;
- append the label to an event, a transcript segment, or a video segment that has been selected from the events library by the user;
- retrieve a first video source corresponding to the particular event and a written transcript that is synchronized to said first video source;
- display the written transcript in a first user-accessible text viewer of the workspace application;
- receive from the user, via the input device, a selection of a portion of the written transcript;
- receive from the user, via the input device, a selection of a location within a second user-accessible text viewer of the workspace application;
- copy the selected portion of the written transcript from the first user-accessible text viewer and paste the selected portion to the location within the second user-accessible text viewer;
- allow the user to repeat said copying and pasting process between the first user-accessible text viewer and the second user-accessible text viewer;
- receive from the user commands to rearrange a plurality of portions within the second user-accessible text viewer in any order;
- create an amalgamated video based on the order of the plurality of portions that appear in the second user-accessible text viewer by combining segments of the first video source corresponding to the plurality of pasted portions;
- play the amalgamated video in a user-accessible video viewer of the workspace application;
- allow the user to continue refining the amalgamated video by receiving user commands for further manipulating the plurality of portions in the second user-accessible text viewer; and
- globally harmonize changes made by the user within the first-user accessible text viewer, the second user-accessible text viewer, and the user-accessible video viewer across the entire workspace application.

6. The non-transitory computer-readable storage medium of claim 5, further comprising instructions, which when executed, cause the processor to:
- display a second transcript of a second video source that is different than the first video source;
- receive user commands to copy and paste portions of the second transcript into the second user-accessible text viewer; and
- responsive to receiving from the user a selected textual transcript segment among the plurality of portions pasted into the second user-accessible text viewer, display video/transcript details of the selected textual transcript segment including an event name, a recording name, and a time code.

7. A method for creating and editing video using written transcripts, the method comprising:
- displaying one or more events within an events library of a network-accessible workspace;
- receiving user input indicative of a selection of a particular event of the one or more events;
- receiving user input specifying a label within the events library,
  - wherein the events library enables a user to create and manage labels usable across the workspace application;
- appending the label to an event, a transcript segment, or a video segment that has been selected from the events library;
- retrieving a first source video corresponding to the particular event and a first transcript that is synchronized to the first source video;
- displaying at least a portion of the first transcript in a first text viewer of the network-accessible workspace;
- receiving user input indicative of a selection of a portion of the first transcript by the user;
- receiving user input indicative of a selection of a location within a second text viewer of the network-accessible workspace;
- copying the portion of the first transcript from the first text viewer and pasting the portion of the first transcript to the location within the second text viewer;
- enabling the user to repeat said copying and pasting between the first and second text viewers;
- enabling the user to rearrange a plurality of first transcript portions within the second text viewer;
- creating a compiled video using a plurality of first source video portions corresponding to the plurality of first transcript portions,
  - wherein the plurality of first source video portions are combined based on an arrangement of the plurality of first transcript portions within the second text viewer;
- presenting the compiled video within a video viewer of the network-accessible workspace;
- enabling the user to modify the compiled video by further manipulating the plurality of first transcript portions within the second text viewer; and
- globally harmonizing changes made within the first text viewer, the second text viewer, and the video viewer across the entire network-accessible workspace.

8. The method of claim 7, further comprising:
enabling the user to play the compiled video in the video viewer.

9. The method of claim 8, wherein the first text viewer, the second text viewer, and the video viewer are accessible via a web browser executing on a network-accessible editing device.

10. The method of claim 8, wherein the first text viewer, the second text viewer, and the video viewer are accessible via a viewer application executing on a network-accessible editing device.

11. The method of claim 7, wherein all user input is supplied by the user via an input device.

12. The method of claim 11, wherein the input device is a mouse, keyboard, gesture-based pointing device, stylus, voice command, or touch-sensitive display.

13. The method of claim 7, further comprising:
- receiving a second source video and a second transcript that is synchronized to the second source video;
- displaying at least a portion of the second transcript in the first text viewer; and
- enabling the user to simultaneously view, copy, and paste portions of the first and second transcripts into the second text viewer.

14. The method of claim 7, further comprising:
responsive to the user selecting one of the plurality of first transcript portions in the second text viewer,
displaying details associated with the selected first transcript portion.

15. The method of claim 14, wherein the details include details about the selected first transcript portion, details about a first source video portion corresponding to the selected first transcript portion, or both.

16. The method of claim 15, wherein the details include event name, recording name, time code, date of recording, time of recording, or a combination thereof.

17. The method of claim 7, wherein the events library, the first text viewer, the second text viewer, and the video viewer are simultaneously viewable within an application executing on an editing device.

18. The method of claim 7, wherein dimensions of the events library, the first text viewer, the second text viewer, and the video viewer are separately manipulable by the user, and wherein an arrangement of the events library, the first text viewer, the second text viewer, and the video viewer within the network-accessible workspace is editable by the user.

* * * * *